(12) United States Patent
Ando et al.

(10) Patent No.: US 12,434,741 B2
(45) Date of Patent: Oct. 7, 2025

(54) VEHICLE CONTROL INTERFACE AND VEHICLE INCLUDING THE SAME, AUTONOMOUS DRIVING SYSTEM AND VEHICLE INCLUDING THE SAME, AND METHOD OF CONTROLLING VEHICLE

(71) Applicant: TOYOTA JIDOSHA KABUSHIKI KAISHA, Toyota (JP)

(72) Inventors: Eisuke Ando, Nagoya (JP); Toshikazu Hioki, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 312 days.

(21) Appl. No.: 17/947,592

(22) Filed: Sep. 19, 2022

(65) Prior Publication Data

US 2023/0109715 A1   Apr. 13, 2023

(30) Foreign Application Priority Data

Sep. 28, 2021   (JP) .................................. 2021-157686

(51) Int. Cl.
*B60W 60/00* (2020.01)
*B60W 50/035* (2012.01)
*B60W 50/14* (2020.01)

(52) U.S. Cl.
CPC ...... *B60W 60/0051* (2020.02); *B60W 50/035* (2013.01); *B60W 50/14* (2013.01); *B60W 60/0061* (2020.02)

(58) Field of Classification Search
CPC ........... B60W 60/0051; B60W 50/035; B60W 50/14; B60W 60/0061; H04L 12/40039; H04L 12/46; G05D 1/00
See application file for complete search history.

(56) References Cited

U.S. PATENT DOCUMENTS

| 10,509,418 | B1* | 12/2019 | Jakusz | ................. G08G 5/0052 |
| 11,584,398 | B2* | 2/2023 | Ito | ........................ G05D 1/0022 |
| 2014/0156134 | A1* | 6/2014 | Cullinane | .............. G05D 1/646 701/23 |
| 2016/0114792 | A1* | 4/2016 | Gibson | ............... B60W 40/105 180/65.265 |
| 2016/0298758 | A1* | 10/2016 | Fujiyoshi | .......... B60W 60/0053 |
| 2016/0303972 | A1* | 10/2016 | Kühne | ................... B60K 35/10 |

(Continued)

FOREIGN PATENT DOCUMENTS

| EP | 1920971 A1 | 5/2008 |
| JP | 2008-120182 A | 5/2008 |

(Continued)

*Primary Examiner* — Angelina M Shudy
(74) *Attorney, Agent, or Firm* — Oliff PLC

(57) ABSTRACT

A vehicle includes a manual like a POV mode that is set when a VP is turned on, a manual with VO mode in which the VP is under the control by an operator, and an autonomy with VO mode in which the VP is under the control by an ADS. A processor of a VCIB is configured 1) to receive an operator command for transition of the vehicle from the manual like a POV mode to the manual with VO mode from the ADS and 2) to provide an autonomy ready signal indicating that autonomous driving of the VP is ready to the ADS and receive an autonomy request for transition of the vehicle from the manual with VO mode to the autonomy with VO mode from the ADS.

17 Claims, 16 Drawing Sheets

(56) References Cited

U.S. PATENT DOCUMENTS

| | | | |
|---|---|---|---|
| 2016/0362116 A1* | 12/2016 | Otsuka | B60W 60/0051 |
| 2017/0235305 A1* | 8/2017 | Jung | B60W 40/072 |
| | | | 701/23 |
| 2018/0237030 A1* | 8/2018 | Jones | B60W 60/0051 |
| 2018/0247544 A1* | 8/2018 | Mustafic | H04W 48/04 |
| 2018/0292829 A1* | 10/2018 | Li | G06Q 10/02 |
| 2018/0314252 A1* | 11/2018 | Asakura | B60W 10/20 |
| 2019/0108680 A1* | 4/2019 | Querejeta Masaveu | |
| | | | G06F 16/5838 |
| 2019/0126942 A1* | 5/2019 | Goto | B60W 40/08 |
| 2020/0223376 A1* | 7/2020 | Tillman | B60R 16/023 |
| 2021/0025365 A1* | 1/2021 | Niu | B60L 58/12 |
| 2021/0086767 A1* | 3/2021 | Matsunaga | B60W 10/20 |
| 2021/0114605 A1* | 4/2021 | Kuang | B60W 30/192 |
| 2021/0114628 A1* | 4/2021 | Khurgin | B60R 25/24 |
| 2021/0171000 A1* | 6/2021 | Hesseler | B60T 8/172 |
| 2021/0179057 A1* | 6/2021 | Shingai | B60T 7/22 |
| 2021/0191402 A1* | 6/2021 | Zhu | B60R 16/0231 |
| 2021/0245654 A1 | 8/2021 | Ando | |
| 2021/0276590 A1* | 9/2021 | McGee | B60W 60/0025 |
| 2021/0280072 A1* | 9/2021 | Ortlieb | G08G 5/0086 |
| 2021/0302958 A1* | 9/2021 | Tschanz | G05D 1/0061 |
| 2021/0316765 A1* | 10/2021 | Harda | B60K 35/00 |
| 2021/0331686 A1* | 10/2021 | Beyers | B60W 60/0053 |
| 2022/0089178 A1 | 3/2022 | Shiga et al. | |
| 2022/0185337 A1* | 6/2022 | Ming | B60W 60/0057 |
| 2022/0274613 A1* | 9/2022 | White | B60W 50/082 |
| 2023/0162377 A1* | 5/2023 | Izuno | G06V 20/59 |
| | | | 382/103 |
| 2023/0339472 A1* | 10/2023 | Bell | B60W 60/0015 |
| 2024/0123865 A1* | 4/2024 | Park | B60W 50/029 |

FOREIGN PATENT DOCUMENTS

| | | |
|---|---|---|
| JP | 2018-060295 A | 4/2018 |
| JP | 2018-132015 A | 8/2018 |
| JP | 2020-123295 A | 8/2020 |
| JP | 2021-123147 A | 8/2021 |
| WO | 2017/006651 A1 | 1/2017 |

\* cited by examiner

<Operator Command>

| Value | Description | Remarks |
|---|---|---|
| 0 | No Request | |
| 1 | Vehicle Operator Present | |
| 2 | No Vehicle Operator | |

FIG.6

<Operator Feedback Signal>

| Value | Description | Remarks |
|---|---|---|
| 0 | Unknown | |
| 1 | Vehicle Operator Present | |
| 2 | No Vehicle Operator | |
| 3 | Reserved | |

FIG.7

<Power Mode Request>

| Value | Description | Remarks |
|---|---|---|
| 0 | No request | |
| 1 | Sleep | |
| 2 | Wake | Turns ON VCIB |
| 3 | Reserved | |
| 4 | Reserved | |
| 5 | Ignition ON | |
| 6 | Drive Mode | |

FIG.8

<Power Mode Status Signal>

| Value | Description | Remarks |
|---|---|---|
| 0 | Reserved | |
| 1 | Sleep | |
| 2 | Wake | Only VCIB is on |
| 3 | Reserved | |
| 4 | Reserved | |
| 5 | Ignition ON | |
| 6 | Drive Mode | |
| 7 | Unknown | |

FIG.9

<VP Autonomy ready signal>

| Value | Description | Remarks |
|---|---|---|
| 0 | Not ready for autonomy | |
| 1 | Ready for autonomy | |
| 2 | Invalid | |

FIG.10

<Autonomy Request>

| Value | Description | Remarks |
|---|---|---|
| 0 | No Request for Autonomy | |
| 1 | Request For Autonomy | |
| 2 | Deactivation Request | Transition to manual mode |

FIG.11

<VP Autonomy Status Signal>

| Value | Description | Remarks |
|---|---|---|
| 0 | Manual Mode | |
| 1 | Autonomy Mode | |

FIG.12

<Propulsion Direction Status Signal>

| Value | Description | Remarks |
|---|---|---|
| 0 | Reserved | |
| 1 | P | |
| 2 | R | |
| 3 | N | |
| 4 | D | |
| 5 | B | |
| 6 | Reserved | |
| 7 | Invalid | Shift range not being set |

FIG.13

<Actual Moving Direction Signal>

| Value | Description | Remarks |
|---|---|---|
| 0 | Forward | |
| 1 | Reverse | |
| 2 | Standstill | |
| 3 | Undefined | |

FIG.14

<Maintenance Request>

| Value | Description | Remarks |
|---|---|---|
| 0 | No request | |
| 1 | Need maintenance | |

FIG.17

| # | | Description |
|---|---|---|
| #1: CREATING A DRIVING PLAN | DRIVING PLAN | THE ADS CREATES A DRIVING PLAN. |
| #2: EXTRACTING PHYSICAL QUANTITIES | EXTRACTS PHYSICAL QUANTITIES, ACCELERATION vs TIME, ROAD WHEEL ANGLE vs TIME | THE ADS EXTRACTS PHYSICAL CONTROL QUANTITIES FROM THE DRIVING PLAN. E.G. PHYSICAL CONTROL QUANTITIES := ACCELERATION, ROAD WHEEL ANGLE, ETC. |
| #3: SPLIT OF PHYSICAL QUANTITIES | SPLITS PHYSICAL QUANTITIES, ACCELERATION vs TIME | THE ADS SPLITS THEM BY DEFINED CYCLE TIME OF EACH API. |
| #4: EXECUTION OF AN API WITH THE VALUE | | THE ADS EXECUTES AN API WITH THE SPLIT PHYSICAL QUANTITY. |
| #5: CALCULATION OF ITS BEHAVIOR | CALCULATES THE BEHAVIOR, ACTUAL BEHAVIOR | THE ADS CALCULATES THE VEHICLE BEHAVIOR, AND RECREATES A DRIVING PLAN TO WHICH THE VEHICLE BEHAVIOR IS REFLECTED |

VEHICLE CONTROL INTERFACE AND VEHICLE INCLUDING THE SAME, AUTONOMOUS DRIVING SYSTEM AND VEHICLE INCLUDING THE SAME, AND METHOD OF CONTROLLING VEHICLE

This nonprovisional application is based on Japanese Patent Application No. 2021-157686 filed with the Japan Patent Office on Sep. 28, 2021, the entire contents of which are hereby incorporated by reference.

BACKGROUND

Field

The present disclosure relates to a vehicle control interface and a vehicle including the same, an autonomous driving system and a vehicle including the same, and a method of controlling a vehicle.

Description of the Background Art

A technique for autonomous driving of a vehicle has recently been developed. For example, Japanese Patent Laying-Open No. 2018-132015 discloses an autonomous driving system that controls autonomous driving of a vehicle in a centralized manner. This autonomous driving system includes a camera, a laser apparatus, a radar apparatus, an operation apparatus, a gradient sensor, an autonomous driving device, and an autonomous driving electronic control unit (ECU).

SUMMARY

The autonomous driving system may externally be attached to a vehicle main body. In this case, autonomous driving is realized by control of a vehicle by a vehicle platform (which will be described later) in accordance with a command from the autonomous driving system.

A vehicle on which an autonomous driving system is mountable may include a manual mode in which a vehicle platform is under the control by an operator (for example, a driver) and an autonomy mode in which the vehicle platform is under the control by the autonomous driving system. There is a demand for appropriate switching between the manual mode and the autonomy mode.

The present disclosure was made to solve the problem above, and an object of the present disclosure is to appropriately switch between a manual mode and an autonomy mode in a vehicle on which an autonomous driving system is mountable.

(1) A vehicle control interface according to one aspect of the present disclosure interfaces between an autonomous driving system (ADS) and a vehicle platform (VP) that controls a vehicle in accordance with a control request from the ADS. The vehicle includes a first manual mode that is set when the VP is turned on, a second manual mode in which an operator is in the VP and the VP is under the control by the operator, and an autonomy mode in which the VP is under the control by the ADS. The vehicle control interface includes a processor and a memory in which a program executable by the processor is stored. The processor is configured to receive, from the ADS, an operator command for transition of the vehicle from the first manual mode to the second manual mode and provide the ADS with an autonomy ready signal indicating readiness for autonomous driving of the VP and receive, from the ADS, an autonomy request for transition of the vehicle from the second manual mode to the autonomy mode.

(2) The processor is configured to receive, from the ADS, the autonomy request that requests cancellation of the autonomy mode, in the autonomy mode.

(3) The vehicle further includes a sleep mode in which the vehicle control interface is shut down. The processor is configured to receive, from the ADS, a power mode request for transition of the vehicle from the second manual mode to the sleep mode, in the second manual mode.

(4) The vehicle further includes a maintenance mode for maintenance of the vehicle. The processor is configured to provide the ADS with a power mode status signal indicating that ignition of the VP has been on, provide the ADS with a propulsion direction status signal indicating that a shift range has been set to a P range, provide the ADS with an actual moving direction signal indicating that the VP is in a standstill, and receive, from the ADS, a maintenance request to an effect of a request for maintenance of the vehicle, in transition from the first manual mode to the maintenance mode.

(5) The processor is configured to provide the ADS with the power mode status signal indicating that ignition of the VP has been on, provide the ADS with the propulsion direction status signal indicating that the shift range has been set to the P range, provide the ADS with the actual moving direction signal indicating that the VP is in the standstill, and receive, from the ADS, the maintenance request to an effect of no request for maintenance of the vehicle, in transition from the maintenance mode to the first manual mode.

(6) A vehicle according to another aspect of the present disclosure includes a vehicle platform (VP) including the vehicle control interface described above.

(7) An autonomous driving system (ADS) according to yet another aspect of the present disclosure is an ADS mountable on a vehicle. The vehicle includes a vehicle platform (VP) that controls the vehicle in accordance with a control request from the ADS. The VP includes a vehicle control interface that interfaces between the ADS and the VP. The vehicle includes a first manual mode that is set when the VP is turned on, a second manual mode in which an operator is in the VP and the VP is under the control by the operator, and an autonomy mode in which the VP is under the control by the ADS. The ADS includes a compute assembly and a communication module configured to communicate with the vehicle control interface. The compute assembly is configured to provide the vehicle control interface with an operator command for transition of the vehicle from the first manual mode to the second manual mode and receive, from the vehicle control interface, an autonomy ready signal indicating readiness for autonomous driving of the VP and provide the vehicle control interface with an autonomy request for transition of the vehicle from the second manual mode to the autonomy mode.

(8) The compute assembly is configured to provide the vehicle control interface with the autonomy request that requests cancellation of the autonomy mode, in the autonomy mode.

(9) The vehicle further includes a sleep mode in which the vehicle control interface is shut down. The compute assembly is configured to provide the vehicle control interface with a power mode request for transition of the vehicle from the second manual mode to the sleep mode, in the second manual mode.

(10) The vehicle further includes a maintenance mode for maintenance of the vehicle. The compute assembly is configured to receive, from the vehicle control interface, a power mode status signal indicating that ignition of the VP has been on, receive, from the vehicle control interface, a propulsion direction status signal indicating that a shift range has been set to a P range, receive, from the vehicle control interface, an actual moving direction signal indicating that the VP is in a standstill, and provide the vehicle control interface with a maintenance request to an effect of a request for maintenance of the vehicle, in transition from the first manual mode to the maintenance mode.

(11) The compute assembly is configured to receive, from the vehicle control interface, the power mode status signal indicating that ignition of the VP has been on, receive, from the vehicle control interface, the propulsion direction status signal indicating that the shift range has been set to the P range, receive, from the vehicle control interface, the actual moving direction signal indicating that the VP is in the standstill, and provide the vehicle control interface with the maintenance request to an effect of no request for maintenance of the vehicle, in transition from the maintenance mode to the first manual mode.

(12) A vehicle according to yet another aspect of the present disclosure includes the ADS described above and a vehicle platform (VP).

(13) In a method of controlling a vehicle according to yet another aspect of the present disclosure, the vehicle includes a vehicle platform (VP) that controls the vehicle in accordance with a control request from an autonomous driving system (ADS). The VP includes a vehicle control interface that interfaces between the ADS and the VP. The method includes setting the vehicle to a first manual mode when the VP is turned on and making transition, by the vehicle, from the first manual mode via a second manual mode to an autonomy mode. The second manual mode is a mode in which an operator is in the VP and the VP is under the control by the operator. The autonomy mode is a mode in which the VP is under the control by the ADS.

(14) The method further includes making transition, by the vehicle, from the autonomy mode to the second manual mode when an autonomy request that requests cancellation of the autonomy mode is provided from the ADS to the vehicle control interface.

(15) The vehicle further includes a sleep mode in which the vehicle control interface is shut down. The method further includes making transition from the second manual mode to the sleep mode when a power mode request for transition of the vehicle from the second manual mode to the sleep mode is provided from the ADS to the vehicle control interface.

(16) The vehicle further includes a maintenance mode for maintenance of the vehicle. The method further includes making transition, by the vehicle, from the first manual mode to the maintenance mode when first, second, third, and fourth conditions are satisfied. The first condition is a condition that a power mode status signal indicating that ignition of the VP has been on is provided from the vehicle control interface to the ADS. The second condition is a condition that a propulsion direction status signal indicating that a shift range has been set to a P range is provided from the vehicle control interface to the ADS. The third condition is a condition that an actual moving direction signal indicating that the VP is in a standstill is provided from the vehicle control interface to the ADS. The fourth condition is a condition that a maintenance request to an effect of a request for maintenance of the vehicle is provided from the ADS to the vehicle control interface.

(17) The method further includes making transition, by the vehicle, from the maintenance mode to the first manual mode when fifth, sixth, seventh, and eighth conditions are satisfied. The fifth condition is a condition that the power mode status signal indicating that ignition of the VP has been on is provided from the vehicle control interface to the ADS. The sixth condition is a condition that the propulsion direction status signal indicating that the shift range has been set to the P range is provided from the vehicle control interface to the ADS. The seventh condition is a condition that the actual moving direction signal indicating that the VP is in the standstill is provided from the vehicle control interface to the ADS. The eighth condition is a condition that the maintenance request to an effect of no request for maintenance of the vehicle is provided from the ADS to the vehicle control interface.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 6 is a diagram for illustrating an operator feedback signal.

FIG. 7 is a diagram for illustrating a power mode request.

FIG. 8 is a diagram for illustrating a power mode status signal.

FIG. 9 is a diagram for illustrating a VP autonomy ready signal.

FIG. 10 is a diagram for illustrating an autonomy request.

FIG. 11 is a diagram for illustrating a VP autonomy status signal.

FIG. 12 is a diagram for illustrating a propulsion direction status signal.

FIG. 13 is a diagram for illustrating an actual moving direction signal.

FIG. 14 is a diagram for illustrating a maintenance request.

FIG. 17 is a diagram showing a typical workflow in the ADS.

DESCRIPTION OF THE PREFERRED EMBODIMENTS

Figure 1:
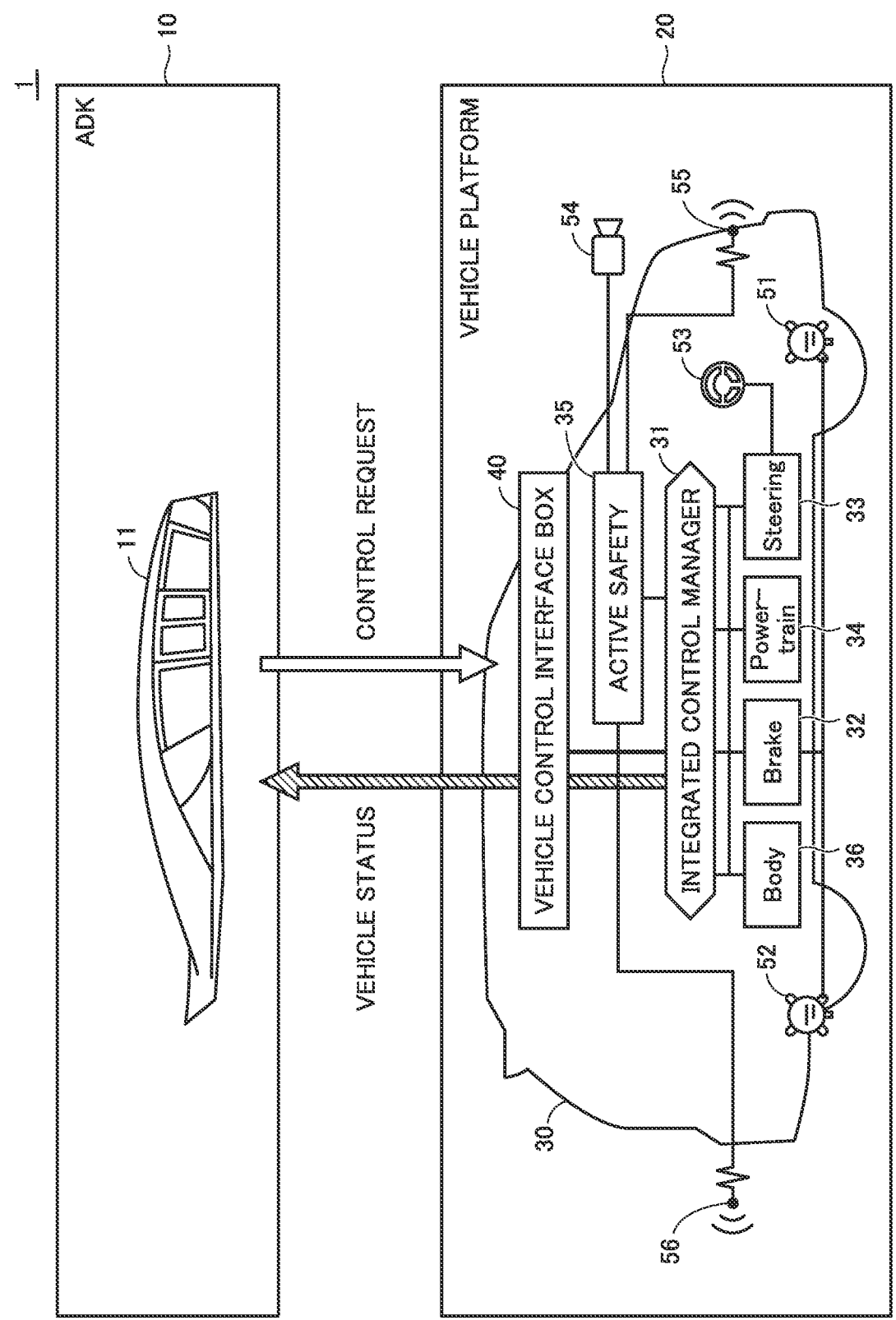
FIG. 1 is a diagram showing overview of a vehicle according to an embodiment of the present disclosure.

An embodiment of the present disclosure will be described below in detail with reference to the drawings.

The same or corresponding elements in the drawings have the same reference characters allotted and description thereof will not be repeated.

Embodiment

FIG. 1 is a diagram showing overview of a vehicle according to an embodiment of the present disclosure. A vehicle 1 includes an autonomous driving kit (ADK) 10 and a vehicle platform (VP) 20. ADK 10 is configured as being attachable to VP 20 (mountable on vehicle 1). ADK 10 and VP 20 are configured to communicate with each other through a vehicle control interface (a VCIB 40 which will be described later).

VP 20 can carry out autonomous driving in accordance with control requests from ADK 10. Though FIG. 1 shows ADK 10 at a position distant from VP 20, ADK 10 is actually attached to a rooftop or the like of VP 20. ADK 10 can also be removed from VP 20. While ADK 10 is not attached, VP 20 carries out travel control (travel control in accordance with an operation by a user) in a manual mode.

ADK 10 includes an autonomous driving system (ADS) 11 for autonomous driving of vehicle 1. For example, ADS 11 creates a driving plan of vehicle 1. ADS 11 outputs various control requests for travel of vehicle 1 in accordance with the driving plan to VP 20 in accordance with an application program interface (API) defined for each control request. ADS 11 receives various signals indicating vehicle statuses (statuses of VP 20) from VP 20 in accordance with the API defined for each signal. Then, ADS 11 has the vehicle status reflected on the driving plan. A detailed configuration of ADS 11 will be described with reference to FIG. 2.

VP 20 includes a base vehicle 30 and a vehicle control interface box (VCIB) 40.

Base vehicle 30 carries out various types of vehicle control in accordance with a control request from ADK 10 (ADS 11). Base vehicle 30 includes various systems and various sensors for controlling base vehicle 30. More specifically, base vehicle 30 includes an integrated control manager 31, a brake system 32, a steering system 33, a powertrain system 34, an active safety system 35, a body system 36, wheel speed sensors 51 and 52, a pinion angle sensor 53, a camera 54, and radar sensors 55 and 56.

Integrated control manager 31 includes a processor and a memory, and integrally controls the systems (brake system 32, steering system 33, powertrain system 34, active safety system 35, and body system 36) involved with operations of vehicle 1.

Brake system 32 is configured to control a braking apparatus provided in each wheel of base vehicle 30. The braking apparatus includes, for example, a disc brake system (not shown) that is operated with a hydraulic pressure regulated by an actuator.

Wheel speed sensors 51 and 52 are connected to brake system 32. Wheel speed sensor 51 detects a rotation speed of a front wheel of base vehicle 30 and outputs the detected rotation speed of the front wheel to brake system 32. Wheel speed sensor 52 detects a rotation speed of a rear wheel of base vehicle 30 and outputs the detected rotation speed of the rear wheel to brake system 32. Brake system 32 outputs to VCIB 40, the rotation speed of each wheel as one of pieces of information included in the vehicle statuses. Brake system 32 generates a braking command to a braking apparatus in accordance with a prescribed control request outputted from ADS 11 through VCIB 40 and integrated control manager 31. Brake system 32 controls the braking apparatus based on the generated braking command. Integrated control manager 31 can calculate a speed of vehicle 1 (vehicle speed) based on the rotation speed of each wheel.

Steering system 33 is configured to control a steering angle of a steering wheel of vehicle 1 with a steering apparatus. The steering apparatus includes, for example, rack-and-pinion electric power steering (EPS) that allows adjustment of a steering angle by an actuator.

Pinion angle sensor 53 is connected to steering system 33. Pinion angle sensor 53 detects an angle of rotation of a pinion gear (a pinion angle) coupled to a rotation shaft of the actuator and outputs the detected pinion angle to steering system 33. Steering system 33 outputs to VCIB 40, the pinion angle as one of pieces of information included in the vehicle statuses. Steering system 33 generates a steering command to the steering apparatus in accordance with a prescribed control request outputted from ADS 11 through VCIB 40 and integrated control manager 31. Steering system 33 controls the steering apparatus based on the generated steering command.

Powertrain system 34 controls an electric parking brake (EPB) system 341 provided in at least one of a plurality of wheels, a parking lock (P-Lock) system 342 provided in a transmission of vehicle 1, and a propulsion system 343 including a shift apparatus (not shown) configured to allow selection of a shift range. A further detailed configuration of powertrain system 34 will be described with reference to FIG. 2.

Active safety system 35 detects an obstacle (a pedestrian, a bicycle, a parked vehicle, a utility pole, or the like) in front or in the rear with the use of camera 54 and radar sensors 55 and 56. Active safety system 35 determines whether or not vehicle 1 may collide with the obstacle based on a distance between vehicle 1 and the obstacle and a direction of movement of vehicle 1. When active safety system 35 determines that there is possibility of collision, it outputs a braking command to brake system 32 through integrated control manager 31 so as to increase braking force.

Body system 36 is configured to control, for example, components such as a direction indicator, a horn, and a wiper (none of which is shown), depending on a state of travel or an environment around vehicle 1. Body system 36 controls each component in accordance with a prescribed control request outputted from ADS 11 through VCIB 40 and integrated control manager 31.

VCIB 40 is configured to communicate with ADS 11 over a controller area network (CAN). VCIB 40 receives various control requests from ADS 11 or outputs a vehicle status to ADS 11 by executing a prescribed API defined for each signal. When VCIB 40 receives the control request from ADS 11, it outputs a control command corresponding to the control request to a system corresponding to the control command through integrated control manager 31. VCIB 40 obtains various types of information on base vehicle 30 from various systems through integrated control manager 31 and outputs the status of base vehicle 30 as the vehicle status to ADS 11.

Vehicle 1 may be used as one of constituent elements of a mobility as a service (MaaS) system. The MaaS system includes, for example, a data server and a mobility service platform (MSPF) (neither of which is shown), in addition to vehicle 1.

The MSPF is an integrated platform to which various mobility services are connected. Autonomous driving related mobility services are connected to the MSPF. In addition to the autonomous driving related mobility services, mobility services provided by a ride-share company, a car-sharing company, a rent-a-car company, a taxi company, and an insurance company may be connected to the MSPF.

Vehicle 1 further includes a data communication module (DCM) (not shown) capable of wirelessly communicating with a data server. The DCM outputs vehicle information such as a speed, a position, or an autonomous driving state to the data server. The DCM receives from the autonomous driving related mobility services through the MSPF and the data server, various types of data for management of travel of an autonomous driving vehicle including vehicle 1 in the mobility services.

The MSPF publishes APIs for using various types of data on vehicle statuses and vehicle control necessary for development of ADS 11. Various mobility services can use various functions provided by the MSPF depending on service contents, by using the APIs published on the MSPF. For example, the autonomous driving related mobility services can obtain operation control data of vehicle 1 or information stored in the data server from the MSPF by using the APIs published on the MSPF. The autonomous driving related mobility services can transmit data for managing an autonomous driving vehicle including vehicle 1 to the MSPF by using the API.

<Detailed Configuration>

Figure 2:
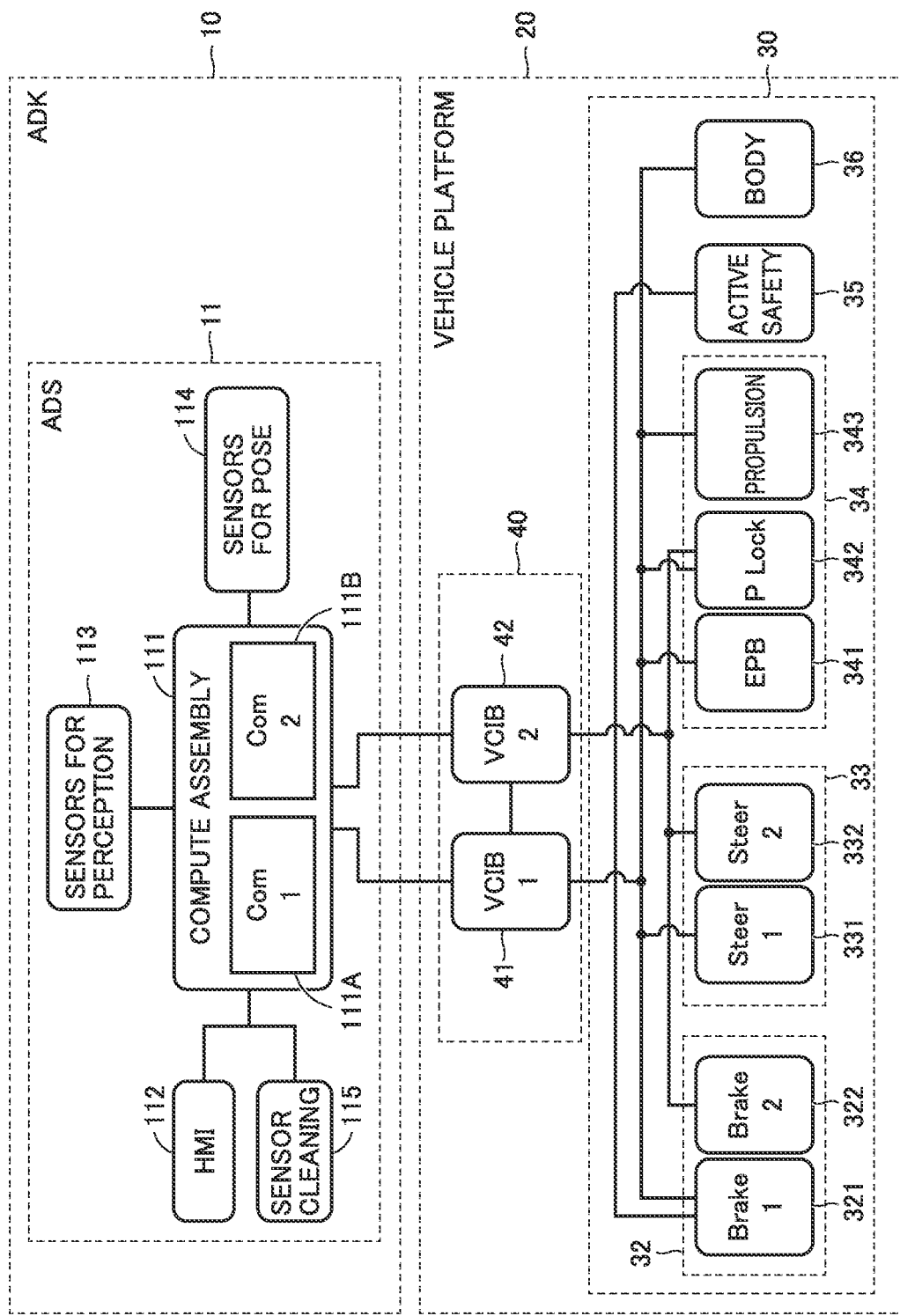
FIG. 2 is a diagram showing in further detail, a configuration of an ADS, a VCIB, and a VP.

FIG. 2 is a diagram showing in further detail, a configuration of ADS 11, VCIB 40, and VP 20. As shown in FIG. 2, ADS 11 includes a compute assembly 111, a human machine interface (HMI) 112, sensors for perception 113, sensors for pose 114, and a sensor cleaning 115.

During autonomous driving of vehicle 1, compute assembly 111 obtains information indicating an environment around vehicle 1 and information indicating a pose, a behavior, and a position of vehicle 1 from various sensors (which will be described later), and obtains a vehicle status from VP 20 through VCIB 40 and sets a next operation (acceleration, deceleration, or turning) of vehicle 1. Compute assembly 111 outputs various commands for realizing a next operation to VCIB 40. Compute assembly 111 includes communication modules 111A and 111B. Communication modules 111A and 111B are each configured to communicate with VCIB 40.

HMI 112 presents information to a user and accepts an operation by the user during autonomous driving, during driving requiring an operation by the user, or at the time of transition between autonomous driving and driving requiring an operation by the user. HMI 112 is constructed to be connected to an input and output apparatus (not shown) such as a touch panel display provided in base vehicle 30.

Sensors for perception 113 are sensors that perceive an environment around vehicle 1. Sensors for perception 113 include, for example, at least one of laser imaging detection and ranging (LIDAR), a millimeter-wave radar, and a camera (none of which is shown). The LIDAR measures a distance and a direction to an object, for example, by emitting laser beams of infrared pulses and detecting laser beams reflected by the object. The millimeter-wave radar measures a distance and a direction to an object by emitting millimeter waves and detecting millimeter waves reflected by the object. The camera is arranged, for example, on a rear side of a room mirror and shoots an image of the front of vehicle 1.

Sensors for pose 114 are sensors that detect a pose, a behavior, or a position of vehicle 1. Sensors for pose 114 include, for example, an inertial measurement unit (IMU) and a global positioning system (GPS) (neither of which is shown). The IMU detects, for example, an acceleration in a front-rear direction, a lateral direction, and a vertical direction of vehicle 1 and an angular speed in a roll direction, a pitch direction, and a yaw direction of vehicle 1. The GPS detects a position of vehicle 1 based on information received from a plurality of GPS satellites that orbit the Earth.

Sensor cleaning 115 is configured to remove with a cleaning solution or a wiper, soiling attached to various sensors (a lens of the camera or a portion from which laser beams are emitted) during traveling of vehicle 1.

VCIB 40 includes a VCIB 41 and a VCIB 42. Each of VCIBs 41 and 42 includes a processor such as a central processing unit (CPU) and a memory such as a read only memory (ROM) and a random access memory (RAM), although none of them is shown. A program executable by the processor is stored in the memory. VCIB 41 and communication module 111A are communicatively connected to each other. VCIB 42 and communication module 111B are communicatively connected to each other. VCIB 41 and VCIB 42 are communicatively connected to each other.

VCIBs 41 and 42 each relay control requests and vehicle information between ADS 11 and VP 20. More specifically, VCIB 41 generates a control command from a control request from ADS 11 with the use of an API. For example, a control command corresponding to a control request supplied from ADS 11 to VCIB 40 includes a propulsion direction command requesting switching of the shift range, an immobilization command requesting activation/deactivation of EPB system 341 and P-Lock system 342, an acceleration command requesting acceleration or deceleration of vehicle 1, a wheel steer angle command requesting a wheel steer angle of a steering wheel, and an autonomization command requesting switching between an autonomous mode and a manual mode. Then, VCIB 41 outputs the generated control command to a corresponding system of a plurality of systems included in VP 20. VCIB 41 generates information indicating a vehicle status from the vehicle information from each system of VP 20 with the use of the API. The information indicating the vehicle status may be information identical to the vehicle information or may be information extracted from the vehicle information to be used for processing performed by ADS 11. VCIB 41 provides the generated information indicating the vehicle status to ADS 11. This is also applicable to VCIB 42.

Brake system 32 includes brake systems 321 and 322. Steering system 33 includes steering systems 331 and 332. Powertrain system 34 includes EPB system 341, P-Lock system 342, and propulsion system 343.

Though VCIB 41 and VCIB 42 are basically equivalent in function to each other, they are partially different in systems connected to the VCIBs that are included in VP 20. Specifically, VCIB 41, brake system 321, steering system 331, EPB system 341, P-Lock system 342, propulsion system 343, and body system 36 are communicatively connected to one another through a communication bus. VCIB 42, brake system 322, steering system 332, and P-Lock system 342 are communicatively connected to one another through a communication bus.

As VCIBs 41 and 42 equivalent in function relating to an operation of at least one of (for example, braking or steering) systems are thus included in VCIB 40, control systems between ADS 11 and VP 20 are redundant. Thus, when some kind of failure occurs in the system, the function of VP 20 can be maintained by switching between the control systems as appropriate or disconnection of a control system where failure has occurred.

Brake systems 321 and 322 are each configured to control a braking apparatus. Brake system 321 generates a braking command to the braking apparatus in accordance with a control request outputted from ADS 11 through VCIB 41. Brake system 322 generates a braking command to the braking apparatus in accordance with a control request outputted from ADS 11 through VCIB 42. Brake system 321 and brake system 322 may be equivalent in function to each other. Alternatively, one of brake systems 321 and 322 may be configured to independently control braking force of each wheel and the other thereof may be configured to control braking force such that equal braking force is generated in the wheels. For example, brake systems 321 and 322 may control the braking apparatus based on a braking command generated by any one of them, and when a failure occurs in that brake system, they may control the braking apparatus based on a braking command generated by the other of them.

Steering systems 331 and 332 are each configured to control a steering angle of a steering wheel of vehicle 1 with a steering apparatus. Steering system 331 generates a steering command to the steering apparatus in accordance with a control request outputted from ADS 11 through VCIB 41. Steering system 332 generates a steering command to the steering apparatus in accordance with a control request outputted from ADS 11 through VCIB 42. Steering system 331 and steering system 332 may be equivalent in function to each other. Alternatively, steering systems 331 and 332 may control the steering apparatus based on the steering command generated by any one of them, and when a failure occurs in that steering system, they may control the steering apparatus based on a steering command generated by the other of them.

EPB system 341 controls the EPB in accordance with a control request outputted from ADS 11 through VCIB 41. The EPB is provided separately from the braking apparatus (a disc brake system or the like), and fixes a wheel by an operation of an actuator. The EPB, for example, activates with an actuator, a drum brake for a parking brake provided in at least one of a plurality of wheels to fix the wheel, or activates a braking apparatus to fix a wheel with an actuator capable of regulating a hydraulic pressure to be supplied to the braking apparatus separately from brake systems 321 and 322.

In the present embodiment, EPB system 341 performs a brakeholding function, and is configured to switch between activation and release of brakehold.

P-Lock system 342 controls a P-Lock apparatus in accordance with a control request outputted from ADS 11 through VCIB 41. For example, when the control request includes a control request to set the shift range to a parking range (P range), P-Lock system 342 activates the P-Lock apparatus, and when the control request includes a control request to set the shift range to a shift range other than the P range, it deactivates the P-Lock apparatus. The P-Lock apparatus fits a protrusion provided at a tip end of a parking lock pawl, a position of which is adjusted by an actuator, into a tooth of a gear (locking gear) provided as being coupled to a rotational element in the transmission of vehicle 1. Rotation of an output shaft of the transmission is thus fixed and the wheel is fixed.

Propulsion system 343 switches the shift range of the shift apparatus and controls driving force from a drive source (a motor generator and an engine) in accordance with a control request outputted from ADS 11 through VCIB 41. The shift ranges include, for example, a neutral range (N range), a forward travel range (D range), and a rearward travel range (R range) in addition to the P range.

Active safety system 35 is communicatively connected to brake system 321. As described previously, active safety system 35 detects an obstacle in front by using camera 54 and/or radar sensor 55, and when it determines that there is possibility of collision, it outputs a braking command to brake system 321 so as to increase braking force.

Body system 36 controls components such as a direction indicator, a horn, or a wiper in accordance with a control request outputted from ADS 11 through VCIB 41.

For example, when an autonomous mode is selected by an operation by the user onto HMI 112 in vehicle 1, autonomous driving is carried out. During autonomous driving, ADS 11 initially creates a driving plan as described previously. Examples of the driving plan include a plan to continue straight travel, a plan to turn left/right at a prescribed intersection on a predetermined travel path, and a plan to change a travel lane. ADS 11 calculates a controllable physical quantity (an acceleration, a deceleration, and a wheel steer angle) necessary for operations of vehicle 1 in accordance with the created driving plan. ADS 11 splits the physical quantity for each execution cycle time of the API. ADS 11 outputs a control request representing the split physical quantity to VCIB 40 by means of the API. Furthermore, ADS 11 obtains a vehicle status (an actual direction of movement of vehicle 1 and a state of fixation of the vehicle) from VP 20 and creates again the driving plan on which the obtained vehicle status is reflected. ADS 11 thus allows autonomous driving of vehicle 1.

<Mode Transition>

Figure 3:
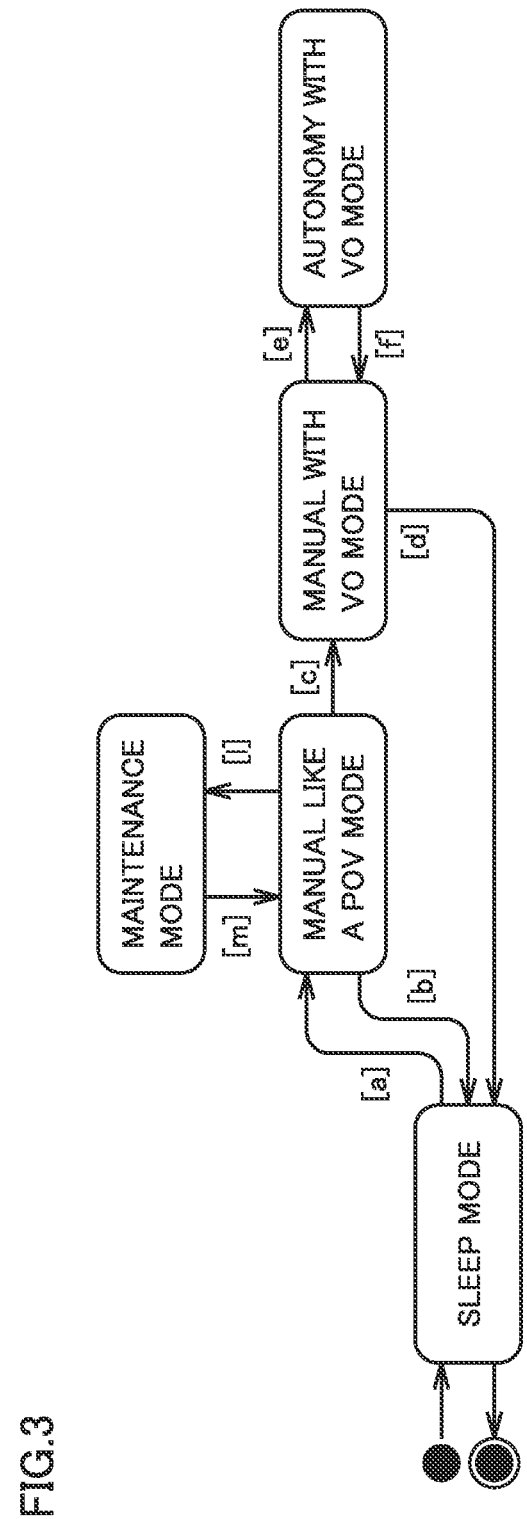
FIG. 3 shows a state machine that shows mode transition of the VP.

FIG. 3 shows a state machine that shows mode transition of vehicle 1. In this example, vehicle 1 includes a sleep mode, two manual modes, one autonomy mode, and a maintenance mode. The two manual modes include a manual like a privately owned vehicle (POV) mode and a manual with vehicle operator (VO) mode. One autonomy mode is an autonomy with VO mode.

<<Sleep Mode>>

The sleep mode refers to a mode in which most systems including VCIB 40 are off. VP 20 (including VCIB 40) immediately after turn-on is in the sleep mode. In the sleep mode, ADS 11 is unable to provide any control command to VP 20. Device authentication of ADS 11 by VCIB 40 is not carried out either.

Since both of integrated control manager 31 and VCIB 40 are off in the sleep mode, none of an operator feedback signal, a power mode status signal, and a VP autonomy status signal is used. Details of each signal will be described later.

<<Manual Like a POV Mode>>

The manual like a POV mode refers to a mode similar to a mode of an ordinary vehicle (a vehicle not adapted to autonomous driving), that is, a mode in which VP 20 is under the control by an operator (a driver or a passenger). In the manual like a POV mode, the operator may or may not be in a compartment (VP 20). The manual like a POV mode corresponds to the "first manual mode" according to the present disclosure.

In the manual like a POV mode, the operator feedback signal="unknown", the power mode status signal="ignition on" or "drive mode," and the VP autonomy status signal="manual mode" are set.

<<Manual with VO Mode>>

The manual with VO mode refers to a manual mode in which the operator is in the compartment. In the manual with VO mode, VCIB 40 is authenticated so that VCIB 40 can communicate with VP 20 (integrated control manager 31). VP 20, however, is under the control by the operator rather than ADS 11. The manual with VO mode corresponds to the "second manual mode" according to the present disclosure.

In the manual with VO mode, the operator feedback signal="Vehicle Operator Present", the power mode status signal="ignition on" or "drive mode," and the VP autonomy status signal="manual mode" are set.

Whether or not the operator is in the compartment can be determined with the use of various known approaches. For example, whether or not somebody is present can be determined by analyzing an image from a camera that shoots the inside of the compartment. Instead of or in addition to the camera, a state of operation onto the human machine interface (HMI) within the compartment, a detection value from a load sensor provided in a seat, a state of fastening of a seat belt, or a state of opening and closing of a door may be used.

<<Autonomy with VO Mode>>

The autonomy with VO mode refers to a mode in which VP 20 is under the control by ADS 11 and vehicle 1 can autonomously run. The autonomy with VO mode corresponds to the "autonomy mode" according to the present disclosure.

In the autonomy with VO mode, the operator feedback signal="Vehicle Operator Present", the power mode status signal="drive mode," and the VP autonomy status signal="autonomy mode" are set.

<<Maintenance Mode>>

The maintenance mode is a mode for maintenance of vehicle 1. In the maintenance mode, in order to prevent movement of vehicle 1, P-Lock system 342 fixes wheels. In addition, integrated control manager 31 rejects a power on request even when the operator presses a start button (not shown). This is for preventing start of an engine (that accompanies generation of exhaust gas indoors) when vehicle 1 falls under a hybrid electric vehicle.

A vehicle may be configured to include only a single manual mode. In contrast, vehicle 1 according to the present embodiment includes two manual modes (the manual like a POV mode and the manual with VO mode). Vehicle 1 makes transition from the manual like a POV mode once to the manual with VO mode and then to the autonomy with VO mode. In other words, vehicle 1 permits interposition of the manual with VO mode between the manual like a POV mode and the autonomy with VO mode. In direct transition from the manual like a POV mode to the autonomy with VO mode, determination as to whether or not the operator is present in the compartment is required. By permitting interposition of the manual with VO mode, presence of the operator in the compartment is ensured at the time of making determination as to whether or not to make transition to the autonomy with VO mode. Therefore, according to the present embodiment, switching from the manual mode to the autonomy mode can be smoothened and appropriate mode transition can be realized.

Figures 4, 5:
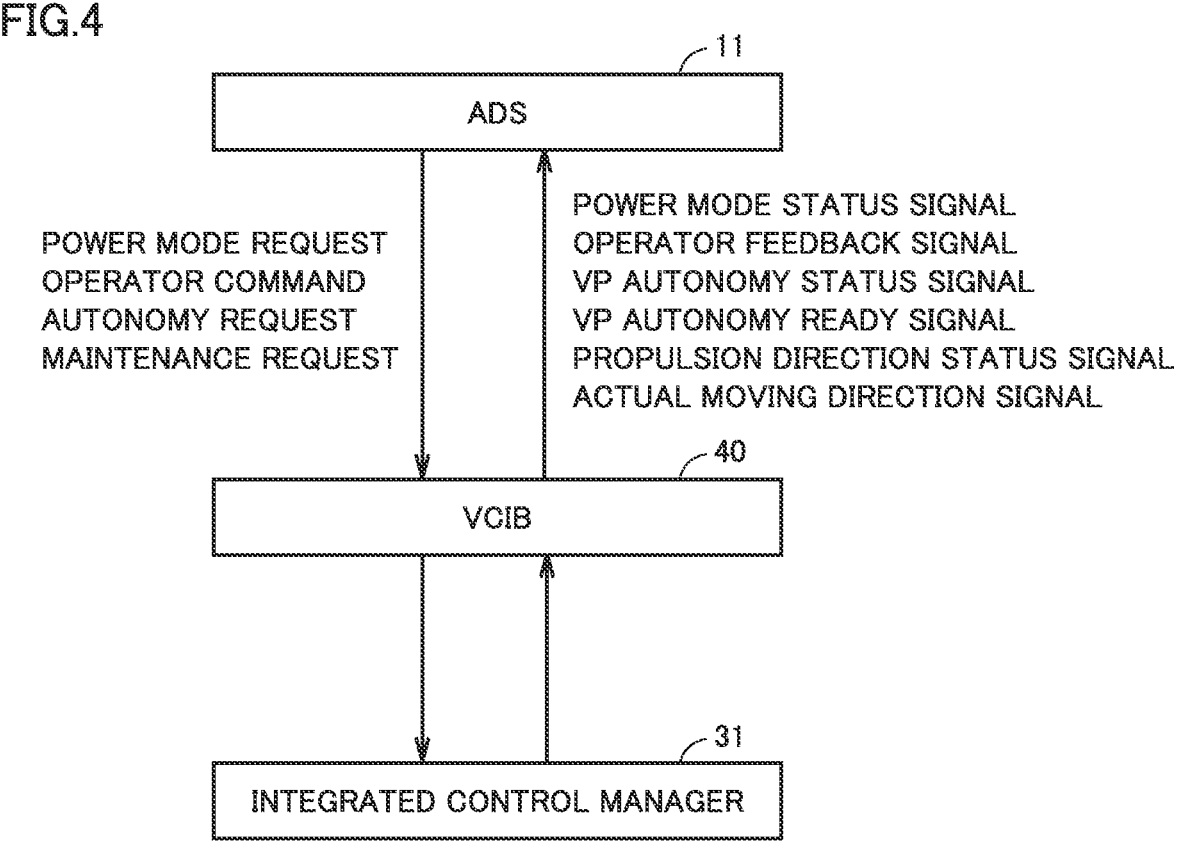
FIG. 4 is a diagram showing a direction of transmission of various signals relating to transition between modes.
FIG. 5 is a diagram for illustrating an operator command.

Transition among the five modes will be described in succession. FIG. 4 is a diagram showing a direction of transmission of various signals or commands relating to transition between modes. In mode transition, VCIB 40 receives a power mode request, an operator command, an autonomy request, or a maintenance request from ADS 11. In addition, VCIB 40 provides a power mode status signal, an operator feedback signal, a VP autonomy status signal, a VP autonomy ready signal, a propulsion direction status signal, or an actual moving direction signal to ADS 11.

Each of FIGS. 5 to 13 is a diagram for illustrating a signal or a command relating to mode transition. Transition a to transition f, transition l, and transition m shown in FIG. 3 will sequentially be described in detail below.

<<Transition a>>

When the operator presses the start button while a physical key (not shown) such as a smart key is present in the compartment in the sleep mode, vehicle 1 makes transition from the sleep mode to the manual like a POV mode.

<<Transition b>>

When the operator presses the start button while the physical key is present in the compartment in the manual like a POV mode, vehicle 1 makes transition from the manual like a POV mode to the sleep mode.

<<Transition c>>

When (1) VP 20 (integrated control manager 31) authenticates VCIB 40 and (2) the operator is present in the compartment in the manual like a POV mode, vehicle 1 makes transition from the manual like a POV mode to the manual with VO mode.

More specifically. ADS 11 provides an operator command representing whether or not the operator is present in the compartment to VCIB 40. VCIB 40 serves as the interface of the operator command (or a command corresponding to the operator command) with integrated control manager 31. As shown in FIG. 5, the operator command indicates any one of "no request," "Vehicle Operator Present", and "No Vehicle Operator". When the operator command="Vehicle Operator Present" is set, integrated control manager 31 can determine that the operator is present in the compartment. Integrated control manager 31 provides feedback about presence of the operator in the compartment to ADS 11 by using the operator feedback signal (see FIG. 6). At the time of turn-on of VP 20, the operator feedback signal="unknown" is set.

<<Transition d>>

When (1) VP 20 makes transition to a vehicle power off status (Ready OFF) or (2) the operator presses the start button while the physical key is present in the compartment in the manual with VO mode, vehicle 1 makes transition from the manual with VO mode to the sleep mode.

More specifically. ADS 11 provides a power mode request for control of the power mode of vehicle 1 to VCIB 40. VCIB 40 serves as the interface of the power mode request (or a request corresponding to the power mode request) with integrated control manager 31. As shown in FIG. 7, the power mode request indicates any one of "no request," "sleep" indicating a vehicle power off status (Ready OFF), "wake" or "ignition on" indicating on of VCIB 40, and "drive mode" indicating a vehicle power on status (Ready ON). Integrated control manager 31 allows VP 20 to make transition to the vehicle power off state when the power mode request="sleep" is set.

VCIB 40 provides the power mode status signal indicating the power mode of vehicle 1 to ADS 11 based on a signal from integrated control manager 31. As shown in FIG. 8, the power mode status signal indicates any one of "sleep", "wake", "ignition on," and "drive mode."

<<Transition e>>

When (1) autonomous driving of VP 20 is ready and (2) ADS 11 requests VCIB 40 to carry out autonomous driving in the manual like a POV mode, vehicle 1 makes transition from the manual like a POV mode to the autonomy with VO mode.

More specifically. VCIB 40 provides a VP autonomy ready signal indicating whether or not vehicle 1 can make transition to the autonomy with VO mode to ADS 11. The VP autonomy ready signal is generated by VCIB 40 based on a signal from integrated control manager 31. As shown in FIG. 9, the VP autonomy ready signal indicates any one of "not ready for autonomy," "ready for autonomy," and "invalid".

ADS 11 provides an autonomy request that controls transition between the manual mode and the autonomy mode to VCIB 40. VCIB 40 serves as the interface of the autonomy request (or a request corresponding to the autonomy request) with integrated control manager 31. As shown in FIG. 10, the autonomy request indicates any one of "no request for autonomy," "request for autonomy," and "deactivation request" which is a request for transition to the manual mode. The VP autonomy status signal indicates one of "manual mode" and "autonomy mode" (see FIG. 11).

When the VP autonomy ready signal="ready for autonomy" and the autonomy request="request for autonomy" are set, vehicle 1 makes transition from the manual like a POV mode to the autonomy with VO mode.

<<Transition f>>

When ADS 11 requests integrated control manager 31 to make transition to the manual mode through VCIB 40 in the autonomy with VO mode, vehicle 1 makes transition from the autonomy with VO mode to the manual like a POV mode. More specifically, when the autonomy request="deactivation request" is set, vehicle 1 makes transition from the autonomy with VO mode to the manual like a POV mode.

<<Transition l>>>

When (1) VP 20 has authenticated VCIB 40, (2) ignition of VP 20 has been on, (3) the shift range has been set to the P range, (4) vehicle 1 is in the standstill, and (5) ADS 11 issues a maintenance request in the manual like a POV mode, vehicle 1 makes transition from the manual like a POV mode to the maintenance mode.

More specifically, VCIB 40 provides the propulsion direction status signal indicating the current shift range to ADS 11. The propulsion direction status signal is generated by VCIB 40 based on a signal from integrated control manager 31. As shown in FIG. 12, the propulsion direction status signal indicates any one of "P", "R", "N", "D", "B", and "invalid (shift range not being set)."

VCIB 40 provides the actual moving direction signal indicating a moving direction of vehicle 1 to ADS 11. The actual moving direction signal is also generated by VCIB 40 based on a signal from integrated control manager 31. As shown in FIG. 13, the actual moving direction signal indicates any one of "forward", "reverse", "standstill", and "undefined". The actual moving direction signal indicating "standstill" is provided when the speed of four wheels has been 0 for a certain period of time.

ADS 11 provides the maintenance request to the effect of a request for maintenance of vehicle 1 to VCIB 40. VCIB 40 serves as the interface of the maintenance request (or a request corresponding to the maintenance request) with integrated control manager 31. As shown in FIG. 14, the maintenance request indicates one of "no request" and "need maintenance."

When the propulsion direction status signal="P", the actual moving direction signal="standstill", and the maintenance request="need maintenance" are set, vehicle 1 makes transition from the manual like a POV mode to the maintenance mode.

<<Transition m>>

When (1) ignition of VP 20 has been on, (2) the shift range has been set to the P range, (3) vehicle 1 is in the standstill, and (4) ADS 11 does not issue the maintenance request in the maintenance mode, vehicle 1 makes transition from the maintenance mode to the manual like a POV mode. More specifically, when the propulsion direction status signal="P", the actual moving direction signal="standstill", and the maintenance request="no request" are set, vehicle 1 makes transition from the maintenance mode to the manual like a POV mode.

As set forth above, in the present embodiment, the manual with VO mode is used in transition from the manual mode to the autonomy mode. Vehicle 1 makes transition from the manual like a POV mode to the autonomy with VO mode via the manual with VO mode. Interposition of the manual with VO mode between the manual like a POV mode and the autonomy with VO mode ensures presence of the operator in the compartment in determination as to whether or not transition to the autonomy with VO mode can be made. Therefore, according to the present embodiment, switching from the manual mode to the autonomy mode can be smoothened and appropriate mode transition can be realized in vehicle 1 on which ADS 11 is mountable.

Transition to the maintenance mode is made from the manual like a POV mode in vehicle 1 (transition l). This is because, unlike the autonomy with VO mode, in the maintenance mode, presence of the operator in the compartment is not required. When an attempt to realize the maintenance mode in a vehicle configured to include only a single manual mode is made, a condition for determining whether or not transition from the single manual mode to the autonomy mode can be made or determining whether or not transition from the single manual mode to the maintenance mode can be made becomes complicated, which may lead to complicated implementation of ADS 11.

In contrast, in the present embodiment, the manual mode is divided into the manual like a POV mode and the manual with VO mode. A condition for determining whether or not transition (transition l or m) between the manual like a POV mode and the maintenance mode can be made is simplified and a condition for determining whether or not transition (transition e or f) between the manual with VO mode and the autonomy with VO mode can be made is simplified. Therefore, implementation of ADS 11 can be less difficult.

EXAMPLE

API Specification for TOYOTA Vehicle Platform
Ver. 1.1
Records of Revision

| Date of Revision | ver. | Overview of Revision | Reviser |
|---|---|---|---|
| 2020 May 23 | 1.0 | Creating a new material | TOYOTA MOTOR Corp. |
| 2021 Apr. 14 | 1.1 | The figure of Front Wheel Steer Angle Rate Limitation is updated. Explanation of Standstill Status is added. | TOYOTA MOTOR Corp. |

Table of Contents

1. Introduction
   1.1. Purpose of this Specification
   1.2. Target Vehicle
   1.3. Definition of Term
2. Structure
   2.1. Overall Structure of Autono-MaaS Vehicle
   2.2. System Structure of Autono-MaaS Vehicle
3. Application Interfaces
   3.1. Typical Usage of APIs
   3.2. APIs for Vehicle Motion Control -continued Table of Contents 3.2.1. API List for Vehicle Motion Control
3.2.2. Details of Each API for Vehicle Motion Control
3.3. APIs for BODY Control
3.3.1. API List for BODY Control
3.3.2. Details of Each API for BODY Control
3.4. APIs for Power Control
3.4.1. API List for Power Control
3.4.2. Details of Each API for Power Control
3.5. APIs for Failure Notification
3.5.1. API List for Failure Notification
3.5.2. Details of Each API for Failure Notification
3.6. APIs for Security
3.6.1. API List for Security
3.6.2. Details of Each API for Security
4. API Guides to Control Toyota Vehicles
4.1. APIs for Vehicle Motion Control
4.1.1. API List for Vehicle Motion Control
4.1.2. API Guides in Details for Vehicle Motion Control
4.2. APIs for BODY Control
4.2.1. API List for BODY Control
4.3. APIs for Power Control
4.3.1 API List for Power Control
4.4. APIs for Failure Notification
4.4.1. API List for Failure Notification
4.5. APIs for Security
4.5.1. API List for Security
4.5.2. API Guides in Details for Security 1. Introduction 1.1. Purpose of this Specification This document is an API specification of vehicle control interface for Autono-MaaS vehicles and contains outline, the way to use and note of APIs.

1.2. Target Vehicle

This specification is applied to the Autono-MaaS vehicles defined by [Architecture Specification for TOYOTA Vehicle Platform attached with Automated Driving System].

1.3. Definition of Term

TABLE 1

Definition of Term

| Term | Definition |
|---|---|
| ADS | Autonomous Driving System |
| ADK | Autonomous Driving Kit |
| VP | Vehicle Platform |
| VCIB | Vehicle Control Interface Box. This is an ECU for the interface and the signal converter between ADS and VP's sub systems. |
| PCS | Pre-Collision Safety |

2. Structure 2.1. Overall Structure of Autono-MaaS Vehicle

Figure 15:
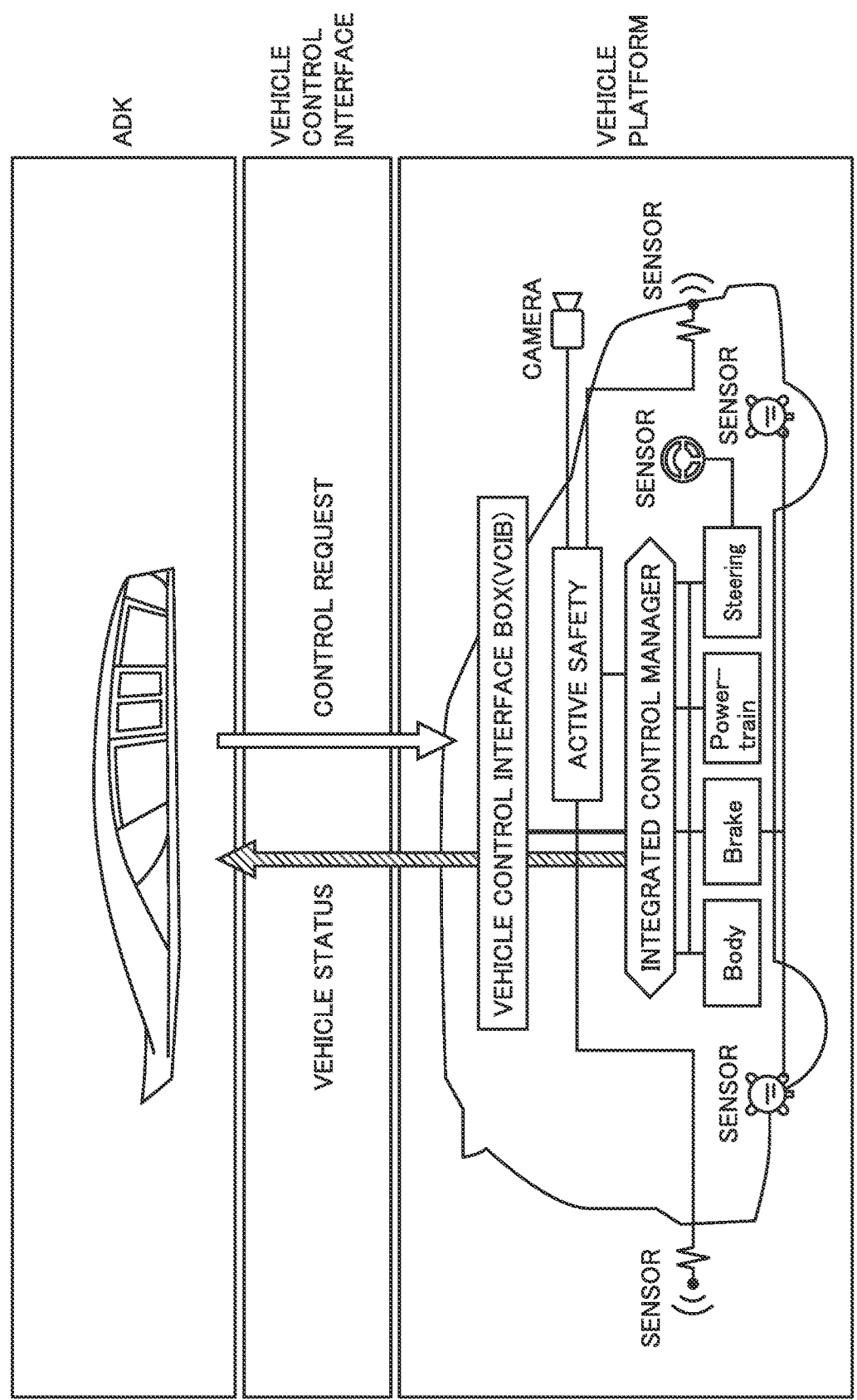
FIG. 15 is a diagram showing an overall structure of an Autono-MaaS vehicle.

The overall structure of Autono-MaaS is shown (FIG. 15).

2.2. System Structure of Autono-MaaS Vehicle

Figure 16:
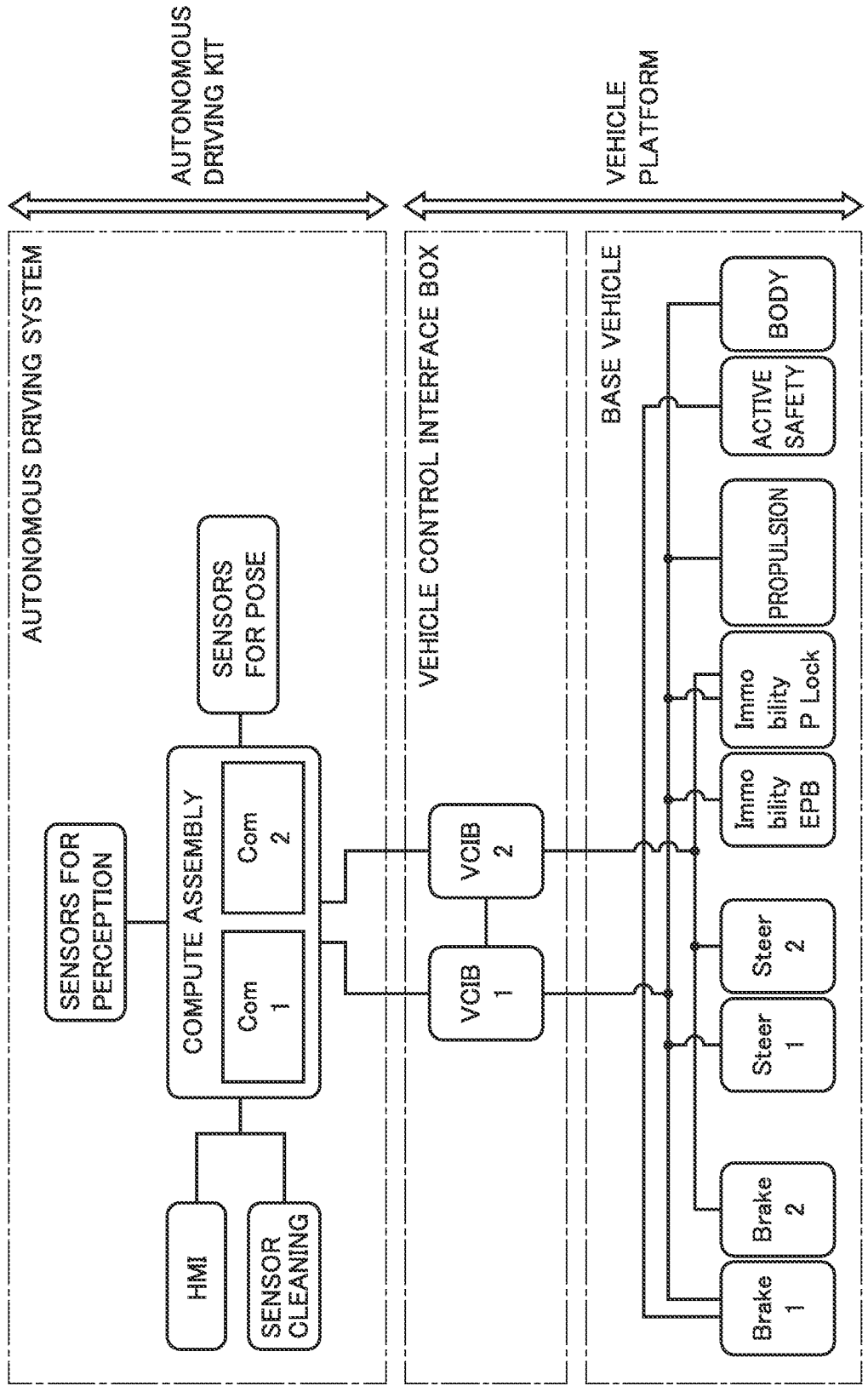
FIG. 16 is a diagram showing a system architecture of the Autono-MaaS vehicle.

System Architecture is shown in FIG. 16.

3. Application Interfaces 3.1. Typical Usage of APIs

In this section. Typical Usage of APIs is described.

A typical workflow of APIs is as follows (FIG. 17). The following example assumes CAN for physical communication.

3.2. APIs for Vehicle Motion Control

In this section, the APIs for vehicle motion control are described.

3.2.1. API List for Vehicle Motion Control 3.2.1.1. Inputs

TABLE 3

Input APIs for vehicle motion control

| Signal Name | Description | Redundancy |
|---|---|---|
| Propulsion Direction Command | Request for shift change from/to forward (D range) to/from back (R range) | N/A |
| Immobilization Command | Request for turning on/off WheelLock | Applied |
| Standstill Command | Request for keeping on/off stationary | Applied |
| Acceleration Command | Request for acceleration/deceleration | Applied |
| Front Wheel Steer Angle Command | Request for front wheel steer angle | Applied |
| Vehicle Mode Command | Request for changing from/to manual mode to/from Autonomous Mode | Applied |
| High Dynamics Command | Request for increasing braking response performance* | Applied |

*Reaction time in VP upon a request from ADK 3.2.1.2. Outputs

TABLE 4

Output APIs for vehicle motion control

| Signal Name | Description | Redundancy |
|---|---|---|
| Propulsion Direction Status | Current shift status | N/A |
| Immobilization Status | Status of immobilization (i.e. EPB and Shift P) | Applied |
| Standstill Status | Standstill status | N/A |
| Estimated Gliding Acceleration | Estimated vehicle acceleration/deceleration when throttle is fully closed | N/A |
| Estimated maximum acceleration | Estimated maximum acceleration | Applied |
| Estimated maximum deceleration | Estimated maximum deceleration | Applied |
| Front wheel steer angle | Front wheel steer angle | Applied |
| Front wheel steer angle rate | Front wheel steer angle rate | Applied |

TABLE 4-continued

Output APIs for vehicle motion control

| Signal Name | Description | Redundancy |
| --- | --- | --- |
| Front wheel steer angle rate limitation | Road wheel angle rate limit | Applied |
| Estimated maximum lateral acceleration | Estimated max lateral acceleration | Applied |
| Estimated maximum lateral acceleration rate | Estimated max lateral acceleration rate | Applied |
| Intervention of accelerator pedal | This signal shows whether the accelerator pedal is depressed by a driver (intervention) | N/A |
| Intervention of brake pedal | This signal shows whether the brake pedal is depressed by a driver (intervention) | N/A |
| Intervention of steering wheel | This signal shows whether the steering wheel is turned by a driver (intervention) | N/A |
| Intervention of shift lever | This signal shows whether the shift lever is controlled by a driver (intervention) | N/A |
| Wheel speed pulse (front left) | Pulse from wheel speed sensor (Front Left Wheel) | N/A |
| Wheel rotation direction (front left) | Rotation direction of wheel (Front Left) | N/A |
| Wheel speed pulse (front right) | Pulse from wheel speed sensor (Front Right Wheel) | N/A |
| Wheel rotation direction (front right) | Rotation direction of wheel (Front Right) | N/A |
| Wheel speed pulse (rear left) | Pulse from wheel speed sensor (Rear Left Wheel) | Applied |
| Wheel rotation direction (Rear left) | Rotation direction of wheel (Rear Left) | Applied |
| Wheel speed pulse (rear right) | Pulse from wheel speed sensor (Rear Right Wheel) | Applied |
| Wheel rotation direction (Rear right) | Rotation direction of wheel (Rear Right) | Applied |
| Traveling direction | Moving direction of vehicle | Applied |
| Vehicle velocity | Estimated longitudinal velocity of vehicle | Applied |
| Longitudinal acceleration | Estimated longitudinal acceleration of vehicle | Applied |
| Lateral acceleration | Sensor value of lateral acceleration of vehicle | Applied |
| Yawrate | Sensor value of yaw rate | Applied |
| Slipping Detection | Detection of tire glide/spin/skid | Applied |
| Vehicle mode state | State of whether Autonomous Mode, manual mode | Applied |
| Readiness for autonomization | Situation of whether the vehicle can transition to Autonomous Mode or not | Applied |
| Failure status of VP functions for Autonomous Mode | This signal is used to show whether VP functions have some failures mode when a vehicle works as Autonomous Mode. | Applied |
| PCS Alert Status | Status of PCS (Alert) | N/A |
| PCS Preparation Status | Status of PCS (Prefill) | N/A |
| PCS Brake/PCS Brake Hold Status | Status of PCS (PB/PBH) | N/A |
| ADS/PCS arbitration status | ADS/PCS arbitration status | N/A |

3.2.2. Details of Each API for Vehicle Motion Control
3.2.2.1. Propulsion Direction Command
  Request for shift change from/to forward (D range) to/from back (R range)
Values

| Value | Description | Remarks |
| --- | --- | --- |
| 0 | No Request | |
| 2 | R | Shift to R range |
| 4 | D | Shift to D range |
| other | Reserved | |

Remarks
  Available only when Vehicle mode state="Autonomous Mode."
  Available only when a vehicle is stationary (Traveling direction="standstill").
  Available only when brake is applied.
3.2.2.2. Immobilization Command
  Request for turning on/off WheelLock
Values
  The following table shows a case where EPB and Shift P are used for immobilization.

| Value | Description | Remarks |
| --- | --- | --- |
| 0 | No Request | |
| 1 | Applied | EPB is turned on and shift position is changed to "P" |
| 2 | Released | EPB is turned off and shift position is changed to the value of Propulsion Direction Command |

Remarks
  This API is used for parking a vehicle.
  Available only when Vehicle mode state="Autonomous Mode."
  Changeable only when the vehicle is stationary (Traveling direction="standstill").
  Changeable only while brake is applied.
3.2.2.3. Standstill Command
  Request for applying/releasing brake holding function
Values

| Value | Description | Remarks |
| --- | --- | --- |
| 0 | No Request | |
| 1 | Applied | Brake holding function is allowed. |
| 2 | Released | |

Remarks
- This API is used for choosing a status of whether the brake holding function is allowed.
- Available only when Vehicle mode state="Autonomous Mode."
- Acceleration Command (deceleration request) has to be continued until Standstill Status becomes "Applied".

3.2.2.4. Acceleration Command

Request for acceleration

Values

Estimated maximum deceleration to Estimated maximum acceleration [m/s$^2$]

Remarks
- Available only when Vehicle mode state="Autonomous Mode."
- Acceleration (+) and deceleration (−) request based on Propulsion Direction Status direction.
- The upper/lower limit will vary based on Estimated maximum deceleration and Estimated maximum acceleration.
- When acceleration more than Estimated maximum acceleration is requested, the request is set to Estimated maximum acceleration.
- When deceleration more than Estimated maximum deceleration is requested, the request is set to Estimated maximum deceleration.
- In case where a driver operates a vehicle (over-ride), the requested acceleration may not be achieved.
- When PCS simultaneously works. VP should choose minimum acceleration (maximum deceleration).

3.2.2.5. Front Wheel Steer Angle Command

Values

| Value | Description | Remarks |
|---|---|---|
| — | [unit: rad] | |

Remarks
- Available only when Vehicle mode state="Autonomous Mode"
- Left is positive value (+). Right is negative value (−).
- Front wheel steer angle is set to value (0) when the vehicle is going straight.
- This request is set as a relative value from the current one to prevent misalignment of "Front Wheel Steer Angle" from being accumulated.
- The request value should be set within Front wheel steer angle rate limitation.
- In case where a driver operates a vehicle (over-ride), the requested Front Wheel Steer Angle may not be achieved.

3.2.2.6. Vehicle Mode Command

Request for changing from/to manual mode to/from Autonomous Mode

Values

| Value | Description | Remarks |
|---|---|---|
| 0 | No Request | |
| 1 | Request For Autonomy | |
| 2 | Deactivation Request | means transition request to manual mode |

Remarks
N/A 3.2.2.7. High Dynamics Command

If ADK would like to increase braking response performance* of VP, High Dynamics Command should be set to "High".

*Reaction time in VP upon a request from ADK

Values

| Value | Description | Remarks |
|---|---|---|
| 0 | No Request | |
| 1 | High | |
| 2-3 | Reserved | |

Remarks
N/A 3.2.2.8. Propulsion Direction Status

Current shift Status

Values

| Value | Description | Remarks |
|---|---|---|
| 0 | Reserved | |
| 1 | P | |
| 2 | R | |
| 3 | N | |
| 4 | D | |
| 5 | Reserved | |
| 6 | Invalid value | |

Remarks
- If VP does not know the current shift status, this output is set to "Invalid Value."

3.2.2.9. Immobilization Status

Each immobilization system status

Values

The following table shows a case where EPB and Shift P are used for immobilization.

| Value | | Description | Remarks |
|---|---|---|---|
| Shift | EPB | | |
| 0 | 0 | Shift set to other than P, and EPB Released | |
| 1 | 0 | Shift set to P and EPB Released | |
| 0 | 1 | Shift set to other than P, and EPB applied | |
| 1 | 1 | Shift set to P and EPB Applied | |

Remarks
N/A 3.2.2.10. Standstill Status

Status of Standstill

Values

| Value | Description | Remarks |
|---|---|---|
| 0 | Released | |
| 1 | Applied | |
| 2 | Reserved | |
| 3 | Invalid value | |

Remarks
N/A 3.2.2.11. Estimated Gliding Acceleration

Acceleration calculated in VP in case that throttle is closed, considering slope, road load and etc.

Values
   [unit: m/s$^2$]
Remarks
   When the Propulsion Direction Status is "D", acceleration for forward direction shows a positive value.
   When the Propulsion Direction Status is "R", acceleration for reverse direction shows a positive value.

3.2.2.12. Estimated Maximum Acceleration
   Acceleration calculated in VP in case that throttle is fully open, considering slope, road load and etc.
Values
   [unit: m/s$^2$]
Remarks
   When the Propulsion Direction Status is "D", acceleration for forward direction shows a positive value.
   When the Propulsion Direction Status is "R", acceleration for reverse direction shows a positive value.

3.2.2.13. Estimated Maximum Deceleration
   Maximum deceleration calculated in VP in case that brake in VP is requested as maximum, considering slope, road load and etc.
Values
   [unit: m/s$^2$]
Remarks
   When the Propulsion Direction Status is "D", deceleration for forward direction shows a negative value.
   When the Propulsion Direction Status is "R", deceleration for reverse direction shows a negative value.

3.2.2.14. Front Wheel Steer Angle
Values

| Value | Description | Remarks |
| --- | --- | --- |
| Minimum Value | Invalid value | |
| others | [unit: rad] | |

Remarks
   Left is positive value (+). Right is negative value (−).
   This signal should show invalid value until VP can calculate correct value or when the sensor is invalid/failed.

3.2.2.15. Front Wheel Steer Angle Rate
   Front wheel steer angle rate
Values

| Value | Description | Remarks |
| --- | --- | --- |
| Minimum Value | Invalid value | |
| others | [unit: rad/s] | |

Remarks
   Left is positive value (+). Right is negative value (−).
   This signal should show invalid value until VP can calculate correct value or when Front wheel steer angle shows the minimum value.

Figure 18:
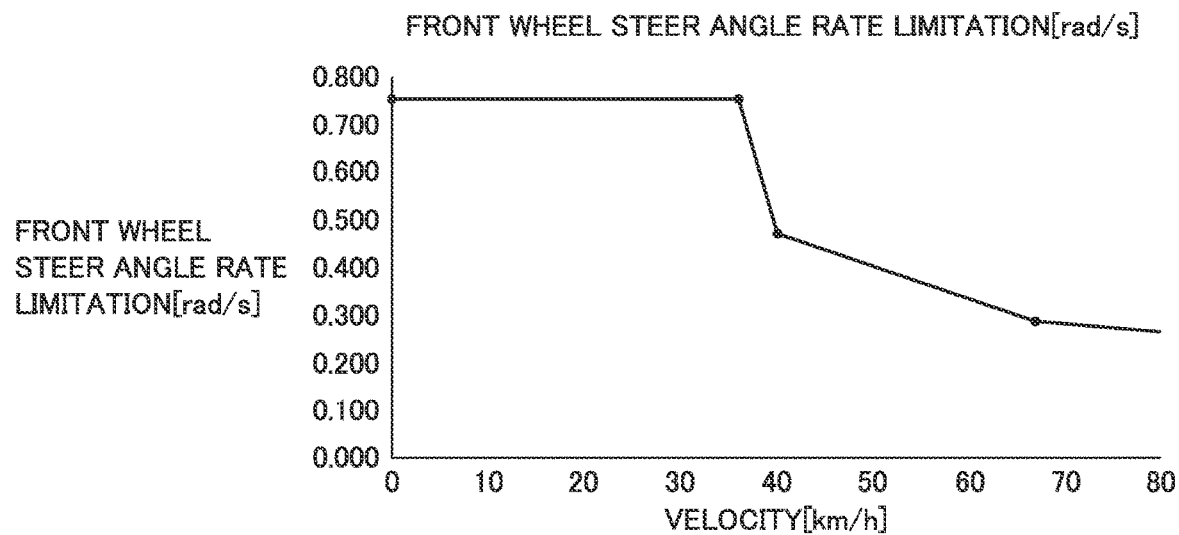
FIG. 18 is a diagram showing relation between a front wheel steer angle rate limitation and a velocity.

3.2.2.16. Front Wheel Steer Angle Rate Limitation
   The limit of the Front wheel steer angle rate
Values
   [unit: rad/s]
Remarks
   The limitation is calculated from the "vehicle speed–steering angle rate" map as shown in following Table 5 and FIG. 18.
   A) At a low speed or stopped situation, use fixed value (0.751 [rad/s]).
   B) At a higher speed, the steering angle rate is calculated from the vehicle speed using 3.432 m/s$^3$.

TABLE 5

"vehicle speed - steering angle rate" map

| | Velocity [km/h] | | | | |
| --- | --- | --- | --- | --- | --- |
| | 0.0 | 36.0 | 40.0 | 67.0 | 84.0 |
| Front Wheel Steer Angle Rate Limitation [rad/s] | 0.751 | 0.751 | 0.469 | 0.287 | 0.253 |

3.2.2.17. Estimated Maximum Lateral Acceleration
   Values
     [unit: m/s$^2$] (fixed value: 3.432)
   Remarks
     Maximum lateral acceleration defined for VP.

3.2.2.18. Estimated Maximum Lateral Acceleration Rate
Values
   [unit: m/s$^3$] (fixed value: 3.432)
Remarks
   Maximum lateral acceleration rate defined for VP.

3.2.2.19. Intervention of Accelerator Pedal
   This signal shows whether the accelerator pedal is depressed by a driver (intervention).
Values

| Value | Description | Remarks |
| --- | --- | --- |
| 0 | Not depressed | |
| 1 | depressed | |
| 2 | Beyond autonomy acceleration | |

Remarks
   When a position of accelerator pedal is higher than a defined threshold, this signal is set to "depressed".
   When the requested acceleration calculated from a position of accelerator pedal is higher than the requested acceleration from ADS, this signal is set as "Beyond autonomy acceleration."

3.2.2.20. Intervention of Brake Pedal
   This signal shows whether the brake pedal is depressed by a driver (intervention).
Values

| Value | Description | Remarks |
| --- | --- | --- |
| 0 | Not depressed | |
| 1 | depressed | |
| 2 | Beyond autonomy deceleration | |

Remarks
   When a position of brake pedal is higher than the defined threshold value, this signal is set to "depressed".
   When the requested deceleration calculated from a position of brake pedal is higher than the requested deceleration from ADS, this signal is set as "Beyond autonomy deceleration".

3.2.2.21. Intervention of Steering Wheel
   This signal shows whether the steering wheel is operated by a driver (intervention).

Values

| Value | Description | Remarks |
|---|---|---|
| 0 | Not turned | |
| 1 | ADS and driver collaboratively work | |
| 2 | Only by human driver | |

Remarks

In "Intervention of steering wheel=1", considering the human driver's intent, EPS system drives the steering with the Human driver collaboratively.

In "Intervention of steering wheel=2", considering the human driver's intent, the steering request from ADS is not achieved. (The steering will be driven by human driver.)

3.2.2.22. Intervention of Shift Lever

This signal shows whether the shift lever is controlled by a driver (intervention)

Values

| Value | Description | Remarks |
|---|---|---|
| 0 | OFF | |
| 1 | ON | Controlled (moved to any shift position) |

Remarks

N/A

3.2.2.23. Wheel Speed Pulse (Front Left), Wheel Speed Pulse (Front Right), Wheel Speed Pulse (Rear Left), Wheel Speed Pulse (Rear Right)

Values

| Value | Description | Remarks |
|---|---|---|
| Maximum Value in transmission bits | Invalid value | The sensor is invalid. |
| others | ticks [unit: —] | The number of pulses per one round wheel depends on VP. |

Remarks

A pulse value is integrated at the pulse falling timing.

This wheel speed sensor outputs 96 pulses with a single rotation.

Regardless of invalid/failure of wheel speed sensor, wheel speed pulse will be updated.

When "1" is subtracted from a pulse value which shows "0", the value changes to "0xFF". When "1" is added to a pulse value which shows "0xFF", the value changes to "0".

Until the rotation direction is determined just after ECU is activated, a pulse value will be added as the rotation direction is "Forward".

When detected forward rotation, a pulse value will be added.

When detected reverse rotation, a pulse value will be subtracted.

3.2.2.24. Wheel Rotation Direction (Front Left), Wheel Rotation Direction (Front Right), Wheel Rotation Direction (Rear Left), Wheel Rotation Direction (Rear Right)

Values

| Value | Description | Remarks |
|---|---|---|
| 0 | Forward | |
| 1 | Reverse | |
| 2 | Reserved | |
| 3 | Invalid value | The sensor is invalid. |

Remarks

"Forward" is set until the rotation direction is determined after VP is turned on.

3.2.2.25. Traveling Direction

Moving direction of vehicle

Values

| Value | Description | Remarks |
|---|---|---|
| 0 | Forward | |
| 1 | Reverse | |
| 2 | Standstill | |
| 3 | Undefined | |

Remarks

This signal shows "Standstill" when four wheel speed values are "0" during a constant time.

When shift is changed right after vehicle starts, it is possible to be "Undefined".

3.2.2.26. Vehicle Velocity

Estimated longitudinal velocity of vehicle

Values

| Value | Description | Remarks |
|---|---|---|
| Maximum Value in transmission bits | Invalid value | The sensor is invalid. |
| others | Velocity [unit: m/s] | |

Remarks

The value of this signal is a positive value when both forward direction and reverse direction.

3.2.2.27. Longitudinal Acceleration

Estimated longitudinal acceleration of vehicle

Values

| Value | Description | Remarks |
|---|---|---|
| Minimum Value in transmission bits | Invalid value | The sensor is invalid. |
| others | Acceleration [unit: $m/s^2$] | |

Remarks

Acceleration (+) and deceleration (−) value based on Propulsion Direction Status direction.

3.2.2.28. Lateral Acceleration
lateral acceleration of vehicle
Values

| Value | Description | Remarks |
| --- | --- | --- |
| Minimum Value in transmission bits | Invalid value | The sensor is invalid |
| others | Acceleration [unit: m/s$^2$] | |

Remarks
A positive value shows counterclockwise. A negative value shows clockwise.

3.2.2.29. Yaw Rate
Sensor value of yaw rate
Values

| Value | Description | Remarks |
| --- | --- | --- |
| Minimum Value in transmission bits | Invalid value | The sensor is invalid. |
| others | Yaw rate [unit: deg/s] | |

Remarks
A positive value shows counterclockwise. A negative value shows clockwise.

3.2.2.30. Slipping Detection
Detection of tire glide/spin/skid
Values

| Value | Description | Remarks |
| --- | --- | --- |
| 0 | Not Slipping | |
| 1 | Slipping | |
| 2 | Reserved | |
| 3 | Invalid value | |

Remarks
This signal is determined as "Slipping" when any of the following systems has been activated.
ABS (Anti-lock Braking System)
TRC (TRaction Control)
VSC (Vehicle Stability Control)
VDIM (Vehicle Dynamics Integrated Management)

3.2.2.31. Vehicle Mode State
Autonomous or manual mode
Values

| Value | Description | Remarks |
| --- | --- | --- |
| 0 | Manual Mode | The mode starts from Manual mode. |
| 1 | Autonomous Mode | |

Remarks
The initial state is set to "Manual Mode."

3.2.2.32. Readiness for Autonomization
This signal shows whether a vehicle can change to Autonomous Mode or not
Values

| Value | Description | Remarks |
| --- | --- | --- |
| 0 | Not Ready For Autonomous Mode | |
| 1 | Ready For Autonomous Mode | |
| 3 | Invalid | The status is not determined yet. |

Remarks
N/A 3.2.2.33. Failure Status of VP Functions for Autonomous Mode
This signal is used to show whether VP functions have some failures mode when a vehicle works as Autonomous Mode.
Values

| Value | Description | Remarks |
| --- | --- | --- |
| 0 | No fault | |
| 1 | Fault | |
| 3 | Invalid | The status is not determined yet. |

Remarks
N/A 3.2.2.34. PCS Alert Status
Values

| Value | Description | Remarks |
| --- | --- | --- |
| 0 | Normal | |
| 1 | Alert | Request alert from PCS system |
| 3 | Unavailable | |

Remarks
N/A 3.2.2.35. PCS Preparation Status
Prefill Status as the preparation of PCS Brake
Values

| Value | Description | Remarks |
| --- | --- | --- |
| 0 | Normal | |
| 1 | Active | |
| 3 | Unavailable | |

Remarks
"Active" is a status in which PCS prepares brake actuator to shorten the latency from a deceleration request issued by PCS.
When a value turns to "Active" during Vehicle mode state="Autonomous Mode," "ADS/PCS arbitration status" shows "ADS".

3.2.2.36. PCS Brake/PCS Brake Hold Status
Values

| Value | Description | Remarks |
| --- | --- | --- |
| 0 | Normal | |
| 1 | PCS Brake | |
| 2 | PCS Brake Hold | |
| 7 | Unavailable | |

Remarks
  N/A
3.2.2.37. ADS/PCS Arbitration Status
  Arbitration status
Values

| Value | Description | Remarks |
|---|---|---|
| 0 | No Request | |
| 1 | ADS | ADS |
| 2 | PCS | PCS Brake or PCS Brake Hold |
| 3 | Invalid value | |

Remarks
  When acceleration requested by PCS system in VP is smaller than one requested by ADS, the status is set as "PCS".
  When acceleration requested by PCS system in VP is larger than one requested by ADS, the status is set as "ADS".
3.3. APIs for BODY Control
3.3.1. API List for BODY Control
3.3.1.1. Inputs

TABLE 6

Input APIs for BODY Control

| Signal Name | Description | Redundancy |
|---|---|---|
| Turnsignal command | Command to control the turnsignallight mode of the vehicle platform | N/A |
| Headlight command | Command to control the headlight mode of the vehicle platform | N/A |
| Hazardlight command | Command to control the hazardlight mode of the vehicle platform | N/A |
| Horn pattern command | Command to control the pattern of horn ON-time and OFF-time per cycle of the vehicle platform | N/A |
| Horn cycle command | Command to control the number of horn ON/OFF cycles of the vehicle platform | N/A |
| Continuous horn command | Command to control of horn ON of the vehicle platform | N/A |
| Front windshield wiper command | Command to control the front windshield wiper of the vehicle platform | N/A |
| Rear windshield wiper command | Command to control the rear windshield wiper mode of the vehicle platform | N/A |
| HVAC (1st row) operation command | Command to start/stop 1st row air conditioning control | N/A |
| HVAC (2nd row) operation command | Command to start/stop 2nd row air conditioning control | N/A |
| Target temperature (1st left) command | Command to set the target temperature around front left area | N/A |
| Target temperature (1st right) command | Command to set the target temperature around front right area | N/A |
| Target temperature (2nd left) command | Command to set the target temperature around rear left area | N/A |
| Target temperature (2nd right) command | Command to set the target temperature around rear right area | N/A |
| HVAC fan (1st row) command | Command to set the fan level on the front AC | N/A |
| HVAC fan (2nd row) command | Command to set the fan level on the rear AC | N/A |
| Air outlet (1st row) command | Command to set the mode of 1st row air outlet | N/A |
| Air outlet (2nd row) command | Command to set the mode of 2nd row air outlet | N/A |
| Air recirculation command | Command to set the air recirculation mode | N/A |
| AC mode command | Command to set the AC mode | N/A |

3.3.1.2. Outputs

TABLE 7

Output APIs for BODY Control

| Signal Name | Description | Redundancy |
|---|---|---|
| Turnsignal status | Status of the current turnsignallight mode of the vehicle platform | N/A |
| Headlight status | Status of the current headlight mode of the vehicle platform | N/A |
| Hazardlight status | Status of the current hazardlight mode of the vehicle platform | N/A |
| Horn status | Status of the current horn of the vehicle platform | N/A |
| Front windshield wiper status | Status of the current front windshield wiper mode of the vehicle platform | N/A |
| Rear windshield wiper status | Status of the current rear windshield wiper mode of the vehicle platform | N/A |
| HVAC (1st row) status | Status of activation of the $1^{st}$ row HVAC | N/A |
| HVAC (2nd row) status | Status of activation of the $2^{nd}$ row HVAC | N/A |
| Target temperature (1st left) status | Status of set temperature of $1^{st}$ row left | N/A |
| Target temperature (1st right) status | Status of set temperature of $1^{st}$ row right | N/A |
| Target temperature (2nd left) status | Status of set temperature of $2^{nd}$ row left | N/A |
| Target temperature (2nd right) status | Status of set temperature of $2^{nd}$ row right | N/A |
| HVAC fan (1st row) status | Status of set fan level of $1^{st}$ row | N/A |
| HVAC fan (2nd row) status | Status of set fan level of $2^{nd}$ row | N/A |
| Air outlet (1st row) status | Status of mode of 1st row air outlet | N/A |
| Air outlet (2nd row) status | Status of mode of 2nd row air outlet | N/A |
| Air recirculation status | Status of set air recirculation mode | N/A |

TABLE 7-continued

Output APIs for BODY Control

| Signal Name | Description | Redundancy |
| --- | --- | --- |
| AC mode status | Status of set AC mode | N/A |
| Seat occupancy (1st right) status | Seat occupancy status in 1st right seat | N/A |
| Seat belt (1st left) status | Status of driver's seat belt buckle switch | N/A |
| Seat belt (1st right) status | Status of passenger's seat belt buckle switch | N/A |
| Seat belt (2nd left) status | Seat belt buckle switch status in 2nd left seat | N/A |
| Seat belt (2nd right) status | Seat belt buckle switch status in 2nd right seat | N/A |
| Seat belt (3rd left) status | Seat belt buckle switch status in 3rd left seat | N/A |
| Seat belt (3rd center) status | Seat belt buckle switch status in 3rd center seat | N/A |
| Seat belt (3rd right) status | Seat belt buckle switch status in 3rd right seat | N/A |

3.3.2. Details of Each API for BODY Control 3.3.2.1. Turnsignal Command

Request to control turn-signal

Values

| Value | Description | Remarks |
| --- | --- | --- |
| 0 | OFF | |
| 1 | Right | Right blinker ON |
| 2 | Left | Left blinker ON |
| 3 | Reserved | |

Remarks

N/A 3.3.2.2. Headlight Command

Request to control headlight

Values

| Value | Description | Remarks |
| --- | --- | --- |
| 0 | No Request | Keep current mode |
| 1 | TAIL mode request | Side lamp mode |
| 2 | HEAD mode request | Lo mode |
| 3 | AUTO mode request | Auto mode |
| 4 | HI mode request | Hi mode |
| 5 | OFF Mode Request | |
| 6-7 | Reserved | |

Remarks

This command is valid when headlight mode on the combination switch="OFF" or "Auto mode=ON."

Driver operation overrides this command.

3.3.2.3. Hazardlight Command

Request to control hazardlight

Values

| Value | Description | Remarks |
| --- | --- | --- |
| 0 | No Request | |
| 1 | ON | |

Remarks

Driver operation overrides this command.

Hazardlight is ON while receiving "ON" command.

3.3.2.4. Horn Pattern Command

Request to choose a pattern of ON-time and OFF-time per cycle

Values

| Value | Description | Remarks |
| --- | --- | --- |
| 0 | No request | |
| 1 | Pattern 1 | ON-time: 250 ms OFF-time: 750 ms |
| 2 | Pattern 2 | ON-time: 500 ms OFF-time: 500 ms |
| 3 | Pattern 3 | Reserved |
| 4 | Pattern 4 | Reserved |
| 5 | Pattern 5 | Reserved |
| 6 | Pattern 6 | Reserved |
| 7 | Pattern 7 | Reserved |

Remarks

N/A 3.3.2.5. Horn Cycle Command

Request to choose the number of ON and OFF cycles

Values 0 to 7 [-]

Remarks

N/A 3.3.2.6. Continuous Horn Command

Request to turn on/off horn

Values

| Value | Description | Remarks |
| --- | --- | --- |
| 0 | No request | |
| 1 | ON | |

Remarks

This command's priority is higher than 3.3.2.4 Horn pattern and 3.3.2.5 Horn cycle command.

Horn is "ON" while receiving "ON" command.

3.3.2.7. Front Windshield Wiper Command

Request to control front windshield wiper

Values

| Value | Description | Remarks |
| --- | --- | --- |
| 0 | OFF mode request | |
| 1 | Lo mode request | |

-continued

| Value | Description | Remarks |
|---|---|---|
| 2 | Hi mode request | |
| 3 | Intermittent mode request | |
| 4 | Auto mode request | |
| 5 | Mist mode request | One-time wiping |
| 6, 7 | Reserved | |

Remarks
This command is valid when front windshield wiper mode on a combination switch is "OFF" or "AUTO".
Driver input overrides this command.
Windshield wiper mode is kept while receiving a command.
Wiping speed of intermittent mode is fixed.

3.3.2.8. Rear Windshield Wiper Command
Request to control rear windshield wiper
Values

| Value | Description | Remarks |
|---|---|---|
| 0 | OFF mode request | |
| 1 | Lo mode request | |
| 2 | Reserved | |
| 3 | Intermittent mode request | |
| 4-7 | Reserved | |

Remarks
Driver input overrides this command
Windshield wiper mode is kept while receiving a command.
Wiping speed of intermittent mode is fixed.

3.3.2.9. HVAC (1st Row) Operation Command
Request to start/stop 1st row air conditioning control
Values

| Value | Description | Remarks |
|---|---|---|
| 0 | No request | |
| 1 | ON | |
| 2 | OFF | |

Remarks
N/A 3.3.2.10. HVAC (2nd Row) Operation Command
Request to start/stop 2nd row air conditioning control
Values

| Value | Description | Remarks |
|---|---|---|
| 0 | No request | |
| 1 | ON | |
| 2 | OFF | |

Remarks
N/A 3.3.2.11. Target Temperature (1st Left) Command
Request to set target temperature in front left area
Values

| Value | Description | Remarks |
|---|---|---|
| 0 | No request | |
| 60 to 85 [unit: ° F.] (by 1.0° F.) | Target temperature | |

Remarks
In case ° C. is used in VP, value should be set as ° C.

3.3.2.12. Target Temperature (1st Right) Command
Request to set target temperature in front right area
Values

| Value | Description | Remarks |
|---|---|---|
| 0 | No request | |
| 60 to 85 [unit: ° F.] (by 10° F.) | Target temperature | |

Remarks
In case ° C. is used in VP, value should be set as ° C.

3.3.2.13. Target Temperature (2nd Left) Command
Request to set target temperature in rear left area
Values

| Value | Description | Remarks |
|---|---|---|
| 0 | No request | |
| 60 to 85 [unit: ° F.] (by 1.0° F.) | Target temperature | |

Remarks
In case ° C. is used in VP, value should be set as ° C.

3.3.2.14. Target Temperature (2nd Right) Command
Request to set target temperature in rear right area
Values

| Value | Description | Remarks |
|---|---|---|
| 0 | No request | |
| 60 to 85 [unit: ° F.] (by 1.0° F.) | Target temperature | |

Remarks
In case ° C. is used in VP, value should be set as ° C.

3.3.2.15. HVAC Fan (1st Row) Command
Request to set fan level of front AC
Values

| Value | Description | Remarks |
|---|---|---|
| 0 | No request | |
| 1 to 7 (Maximum) | Fan level | |

Remarks
If you would like to turn the fan level to 0 (OFF), you should transmit "HVAC (1st row) operation command=OFF."
If you would like to turn the fan level to AUTO, you should transmit "HVAC (1st row) operation command=ON."

3.3.2.16. HVAC Fan (2nd Row) Command
Request to set fan level of rear AC
Values

| Value | Description | Remarks |
|---|---|---|
| 0 | No request | |
| 1 to 7 (Maximum) | Fan level | |

Remarks
If you would like to turn the fan level to 0 (OFF), you should transmit "HVAC (2nd row) operation command=OFF."

If you would like to turn the fan level to AUTO, you should transmit "HVAC (2nd row) operation command=ON."

3.3.2.17. Air Outlet (1st Row) Command
Request to set 1st row air outlet mode
Values

| Value | Description | Remarks |
|---|---|---|
| 0 | No Operation | |
| 1 | UPPER | Air flows to upper body |
| 2 | U/F | Air flows to upper body and feet |
| 3 | FEET | Air flows to feet |
| 4 | F/D | Air flows to feet and windshield defogger |

Remarks
N/A 3.3.2.18. Air Outlet (2nd Row) Command
Request to set 2nd row air outlet mode
Values

| Value | Description | Remarks |
|---|---|---|
| 0 | No Operation | |
| 1 | UPPER | Air flows to upper body |
| 2 | U/F | Air flows to the upper body and feet |
| 3 | FEET | Air flows to feet. |

Remarks
N/A 3.3.2.19. Air Recirculation Command
Request to set air recirculation mode
Values

| Value | Description | Remarks |
|---|---|---|
| 0 | No request | |
| 1 | ON | |
| 2 | OFF | |

Remarks
N/A 3.3.2.20. AC Mode Command
Request to set AC mode
Values

| Value | Description | Remarks |
|---|---|---|
| 0 | No request | |
| 1 | ON | |
| 2 | OFF | |

Remarks
N/A 3.3.2.21. Turnsignal Status
Values

| Value | Description | Remarks |
|---|---|---|
| 0 | OFF | |
| 1 | Left | |
| 2 | Right | |
| 3 | Invalid | |

Remarks
N/A 3.3.2.22. Headlight Status
Values

| Value | Description | Remarks |
|---|---|---|
| 0 | OFF | |
| 1 | TAIL | |
| 2 | Lo | |
| 3 | Reserved | |
| 4 | Hi | |
| 5-6 | Reserved | |
| 7 | Invalid | |

Remarks
N/A 3.3.2.23. Hazardlight Status
Values

| Value | Description | Remarks |
|---|---|---|
| 0 | OFF | |
| 1 | Hazard | |
| 2 | Reserved | |
| 3 | Invalid | |

Remarks
N/A 3.3.2.24. Horn Status
Values

| Value | Description | Remarks |
|---|---|---|
| 0 | OFF | |
| 1 | ON | |
| 2 | Reserved | |
| 3 | Invalid | |

Remarks
In the case that 3.3.2.4 the Horn Pattern Command is active, the Horn status is "1" even if there are OFF periods in some patterns.

3.3.2.25. Front Windshield Wiper Status
Values

| Value | Description | Remarks |
|---|---|---|
| 0 | OFF | |
| 1 | Lo | |
| 2 | Hi | |
| 3 | INT | |
| 4-5 | Reserved | |
| 6 | Fail | |
| 7 | Invalid | |

Remarks
N/A 3.3.2.26. Rear Windshield Wiper Status
Values

| Value | Description | Remarks |
|---|---|---|
| 0 | OFF | |
| 1 | Lo | |
| 2 | Reserved | |
| 3 | INT | |

| Value | Description | Remarks |
|---|---|---|
| 4-5 | Reserved | |
| 6 | Fail | |
| 7 | Invalid | |

Remarks
 N/A
3.3.2.27. HVAC (1st Row) Status
Values

| Value | Description | Remarks |
|---|---|---|
| 0 | OFF | |
| 1 | ON | |

Remarks
 N/A
3.3.2.28. HVAC (2nd Row) Status
Values

| Value | Description | Remarks |
|---|---|---|
| 0 | OFF | |
| 1 | ON | |

Remarks
 N/A
3.3.2.29. Target Temperature (1st Left) Status
Values

| Value | Description | Remarks |
|---|---|---|
| 0 | Lo | Max cold |
| 60 to 85 [unit: ° F.] | Target temperature | |
| 100 | Hi | Max hot |
| FFh | Unknown | |

Remarks
 In case ° C. is used in VP, value should be set as ° C.
3.3.2.30. Target Temperature (1st Right) Status
Values

| Value | Description | Remarks |
|---|---|---|
| 0 | Lo | Max cold |
| 60 to 85 [unit: ° F.] | Target temperature | |
| 100 | Hi | Max hot |
| FFh | Unknown | |

Remarks
 In case ° C. is used in VP, value should be set as ° C.
3.3.2.31. Target Temperature (2nd Left) Status
Values

| Value | Description | Remarks |
|---|---|---|
| 0 | Lo | Max cold |
| 60 to 85 [unit: ° F.] | Target temperature | |
| 100 | Hi | Max hot |
| FFh | Unknown | |

Remarks
 In case ° C. is used in VP, value should be set as ° C.
3.3.2.32. Target Temperature (2nd Right) Status
Values

| Value | Description | Remarks |
|---|---|---|
| 0 | Lo | Max cold |
| 60 to 85 [unit: ° F.] | Target temperature | |
| 100 | Hi | Max hot |
| FFh | Unknown | |

Remarks
 In case ° C. is used in VP, value should be set as ° C.
3.3.2.33. HVAC Fan (1st Row) Status
Values

| Value | Description | Remarks |
|---|---|---|
| 0 | OFF | |
| 1 to 7 | Fan Level | |
| 8 | Undefined | |

Remarks
 N/A
3.3.2.34. HVAC Fan (2nd Row) Status
Values

| Value | Description | Remarks |
|---|---|---|
| 0 | OFF | |
| 1 to 7 | Fan Level | |
| 8 | Undefined | |

Remarks
 N/A
3.3.2.35. Air Outlet (1st Row) Status
Values

| Value | Description | Remarks |
|---|---|---|
| 0 | ALL OFF | |
| 1 | UPPER | Air flows to upper body |
| 2 | U/F | Air flows to upper body and feet |
| 3 | FEET | Air flows to feet. |
| 4 | F/D | Air flows to feet and windshield defogger operates |
| 5 | DEF | Windshield defogger |
| 7 | Undefined | |

Remarks
 N/A
3.3.2.36. Air Outlet (2nd Row) Status
Values

| Value | Description | Remarks |
|---|---|---|
| 0 | ALL OFF | |
| 1 | UPPER | Air flows to upper body |
| 2 | U/F | Air flows to upper body and feet |
| 3 | FEET | Air flows to feet. |
| 7 | Undefined | |

Remarks
  N/A
3.3.2.37. Air Recirculation Status
  Values

| Value | Description | Remarks |
|---|---|---|
| 0 | OFF | |
| 1 | ON | |

Remarks
  N/A
3.3.2.38. AC Mode Status
  Values

| Value | Description | Remarks |
|---|---|---|
| 0 | OFF | |
| 1 | ON | |

Remarks
  N/A
3.3.2.39. Seat Occupancy (1st Right) Status
Values

| Value | Description | Remarks |
|---|---|---|
| 0 | Not occupied | |
| 1 | Occupied | |
| 2 | Undecided | In case of IG OFF or communication disruption to seat sensor |
| 3 | Failed | |

Remarks
  When there is luggage on the seat, this signal may be set as "Occupied".
3.3.2.40. Seat Belt (1st Left) Status
Values

| Value | Description | Remarks |
|---|---|---|
| 0 | Buckled | |
| 1 | Unbuckled | |
| 2 | Undetermined | In case where sensor does not work just after IG-ON |
| 3 | Fault of a switch | |

Remarks
  N/A
3.3.2.41. Seat Belt (1st Right) Status
Values

| Value | Description | Remarks |
|---|---|---|
| 0 | Buckled | |
| 1 | Unbuckled | |
| 2 | Undetermined | In case where sensor does not work just after IG-ON |
| 3 | Fault of a switch | |

Remarks
  N/A
3.3.2.42. Seat Belt (2nd Left) Status
Values

| Value | Description | Remarks |
|---|---|---|
| 0 | Buckled | |
| 1 | Unbuckled | |
| 2 | Undetermined | In case where sensor does not work just after IG-ON |
| 3 | Reserved | |

Remarks
  cannot detect sensor failure
3.3.2.43. Seat Belt (2nd Right) Status
Values

| Value | Description | Remarks |
|---|---|---|
| 0 | Buckled | |
| 1 | Unbuckled | |
| 2 | Undetermined | In case where sensor does not work just after IG-ON |
| 3 | Reserved | |

Remarks
  cannot detect sensor failure
3.3.2.44. Seat Belt (3rd Left) Status
Values

| Value | Description | Remarks |
|---|---|---|
| 0 | Buckled | |
| 1 | Unbuckled | |
| 2 | Undetermined | In case where sensor does not work just after IG-ON |
| 3 | Reserved | |

Remarks
  cannot detect sensor failure
3.3.2.45. Seat Belt (3rd Center) Status
Values

| Value | Description | Remarks |
|---|---|---|
| 0 | Buckled | |
| 1 | Unbuckled | |
| 2 | Undetermined | In case where sensor does not work just after IG-ON |
| 3 | Reserved | |

Remarks
  cannot detect sensor failure
3.3.2.46. Seat Belt (3rd Right) Status
Values

| Value | Description | Remarks |
|---|---|---|
| 0 | Buckled | |
| 1 | Unbuckled | |
| 2 | Undetermined | In case where sensor does not work just after IG-ON |
| 3 | Reserved | |

Remarks
cannot detect sensor failure

3.4. APIs for Power Control
3.4.1. API List for Power Control
3.4.1.1. Inputs

TABLE 8

| Input APIs for Power control | | |
|---|---|---|
| Signal Name | Description | Redundancy |
| Power mode command | Command to control the power mode of VP | N/A |

3.4.1.2. Outputs

TABLE 9

| Output APIs for Power control | | |
|---|---|---|
| Signal Name | Description | Redundancy |
| Power mode status | Status of the current power mode of VP | N/A |

3.4.2. Details of Each API for Power Control
3.4.2.1. Power Mode Command
Request to control power mode
Values

| Value | Description | Remarks |
|---|---|---|
| 0 | No request | |
| 1 | Sleep | Turns OFF the vehicle |
| 2 | Wake | Turns ON VCIB |
| 3 | Reserved | Reserved for data expansion |
| 4 | Reserved | Reserved for data expansion |
| 5 | Reserved | Reserved for data expansion |
| 6 | Drive | Turns ON the vehicle |

Figure 19:
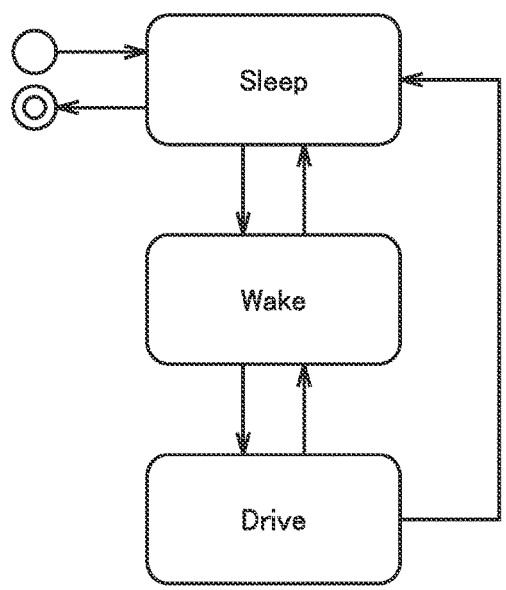
FIG. 19 is a state machine diagram of the power mode.

Remarks
The state machine diagram of the power modes is shown in FIG. 19.

[Sleep]
Vehicle power off condition. In this mode, the main battery does not supply power to each system, and neither VCIB nor other VP ECUs are activated.

[Wake]
VCIB is awake by the auxiliary battery. In this mode, ECUs other than VCIB are not awake except for some of the body electrical ECUs.

[Driving Mode]
Vehicle power on condition. In this mode, the main battery supplies power to the whole VP and all the VP ECUs including VCIB are awake.

3.4.2.2. Power Mode Status
Values

| Value | Description | Remarks |
|---|---|---|
| 0 | Reserved | |
| 1 | Sleep | |
| 2 | Wake | |
| 3 | Reserved | |
| 4 | Reserved | |

| Value | Description | Remarks |
|---|---|---|
| 5 | Reserved | |
| 6 | Drive | |
| 7 | Unknown | means unhealthy situation would occur |

Remarks
VCIB will transmit [Sleep] as Power_Mode_Status continuously for 3000 [ms] after executing the sleep sequence. And then, VCIB will shut down.
ADS should stop transmitting signals to VCIB while VCIB is transmitting [Sleep].

3.5. APIs for Failure Notification
3.5.1. API List for Failure Notification
3.5.1.1. Inputs

TABLE 10

| Input APIs for Failure Notification | | |
|---|---|---|
| Signal Name | Description | Redundancy |
| N/A | N/A | N/A |

3.5.1.2. Outputs

TABLE 11

| Output APIs for Failure Notification | | |
|---|---|---|
| Signal Name | Description | Redundancy |
| Request for ADS operation | | Applied |
| Impact detection signal | | N/A |
| Performance deterioration of brake system | | Applied |
| Performance deterioration of propulsion system | | N/A |
| Performance deterioration of shift control system | | N/A |
| Performance deterioration of immobilization system | | Applied |
| Performance deterioration of steering system | | Applied |
| Performance deterioration of power supply system | | Applied |
| Performance deterioration of communication system | | Applied |

3.5.2. Details of each API for Failure Notification
3.5.2.1. Request for ADS Operation
Values

| Value | Description | Remarks |
|---|---|---|
| 0 | No request | |
| 1 | Need maintenance | |
| 2 | Need to be back to garage | |
| 3 | Need to stop immediately | |
| Others | Reserved | |

Remarks
This signal shows a behavior which the ADS is expected to do according to a failure which happened in the VP.

3.5.2.2. Impact Detection Signal

Values

| Value | Description | Remarks |
|---|---|---|
| 0 | Normal | |
| 5 | Crash detection with activated airbag | |
| 6 | Crash detection with shut off high voltage circuit | |
| 7 | Invalid value | |
| Others | Reserved | |

Remarks

When the event of crash detection is generated, the signal is transmitted 50 consecutive times every 100 [ms]. If the crash detection state changes before the signal transmission is completed, the high signal of priority is transmitted.

Priority: crash detection>normal

Transmits for 5 s regardless of ordinary response at crash, because the vehicle breakdown judgment system shall be sent a voltage OFF request for 5 s or less after crash in HV vehicle.

Transmission interval is 100 ms within fuel cutoff motion delay allowance time (1 s) so that data can be transmitted more than 5 times.

In this case, an instantaneous power interruption is taken into account.

3.5.2.3. Performance Deterioration of Brake System

Values

| Value | Description | Remarks |
|---|---|---|
| 0 | Normal | — |
| 1 | Deterioration detected | — |

Remarks

N/A

3.5.2.4. Performance Deterioration of Propulsion System

Values

| Value | Description | Remarks |
|---|---|---|
| 0 | Normal | — |
| 1 | Deterioration detected | — |

Remarks

N/A

3.5.2.5. Performance Deterioration of Shift Control System

Values

| Value | Description | Remarks |
|---|---|---|
| 0 | Normal | — |
| 1 | Deterioration detected | — |

Remarks

N/A

3.5.2.6. Performance Deterioration of Immobilization System

Values

| Value | Description | Remarks |
|---|---|---|
| 0 | Normal | — |
| 1 | Deterioration detected | — |

Remarks

N/A

3.5.2.7. Performance Deterioration of Steering System

Values

| Value | Description | Remarks |
|---|---|---|
| 0 | Normal | — |
| 1 | Deterioration detected | — |

Remarks

N/A

3.5.2.8. Performance Deterioration of Power Supply System

Values

| Value | Description | Remarks |
|---|---|---|
| 0 | Normal | — |
| 1 | Deterioration detected | — |

Remarks

N/A

3.5.2.9. Performance Deterioration of Communication System

Values

| Value | Description | Remarks |
|---|---|---|
| 0 | Normal | — |
| 1 | Deterioration detected | — |

Remarks

N/A

3.6. APIs for Security

3.6.1. API List for Security

3.6.1.1. Inputs

| Input APIs for Security | | |
|---|---|---|
| Signal Name | Description | Redundancy |
| Door Lock (front) command | Command to control both 1st doors lock | N/A |
| Door Lock (rear) command | Command to control both 2nd doors and trunk lock | N/A |
| Central door lock command | Command to control the all door lock | N/A |
| Device Authentication Signature the 1st word | This is the 8th byte from the 1st byte of the Signature value. | N/A |
| Device Authentication Signature the 2nd word | This is the 16th byte from the 9th byte of the Signature value. | N/A |
| Device Authentication Signature the 3rd word | This is the 24th byte from the 17th byte of the Signature value. | N/A |
| Device Authentication Signature the 4th word | This is the 32th byte from the 25th byte of the Signature value. | N/A |

3.6.1.2. Outputs

TABLE 13

Output APIs for Security

| Signal Name | Description | Redundancy |
| --- | --- | --- |
| Door lock (1st left) status | Status of the current 1st-left door lock | N/A |
| Door lock (1st right) status | Status of the current 1st-right door lock | N/A |
| Door lock (2nd left) status | Status of the current 2nd-left door lock | N/A |
| Door lock (2nd right) status | Status of the current 2nd-right door lock | N/A |
| Trunk Lock status | Status of the current trunk (back door) lock | N/A |
| Central door lock status | Status of the current all door lock | N/A |
| Alarm system status | Status of the current vehicle alarm | N/A |
| Device Authentication Seed the 1st word | This is the 8th byte from the 1st byte of the Seed value. | N/A |
| Device Authentication Seed the 2nd word | This is the 16th byte from the 9th byte of the Seed value. | N/A |
| Trip Counter | This counter is incremented in units of trips by the Freshness Value management master ECU. | N/A |
| Reset Counter | This counter is incremented periodically by the Freshness Value management master ECU. | N/A |
| 1st Left Door Open Status | Status of the current 1st-left door open/close of the vehicle platform | N/A |
| 1st Right Door Open Status | Status of the current 1st-right door open/close of the vehicle platform | N/A |
| 2nd Left Door Open Status | Status of the current 2nd-left door open/close of the vehicle platform | N/A |
| 2nd Right Door Open Status | Status of the current 2nd-right door open/close of the vehicle platform | N/A |
| Trunk Status | Status of the current trunk door open of the vehicle platform | N/A |
| Hood Open Status | Status of the current hood open/close of the vehicle platform | N/A |

3.6.2. Details of Each API for Security

3.6.2.1. Door Lock (Front) Command, Door Lock (Rear) Command

Values

| Value | Description | Remarks |
| --- | --- | --- |
| 0 | No Request | |
| 1 | Lock | Not supported in Toyota VP |
| 2 | Unlock | |
| 3 | Reserved | |

Remarks

If ADK requests for unlocking front side, both front doors are unlocked.

If ADK requests for unlocking rear side, both 2nd row and trunk doors are unlocked.

If ADK requests for locking any door, it should use "Central door lock command."

(The functionality for individual locking is not supported in Toyota VP.)

3.6.2.2. Central Door Lock Command

Request to control all doors' lock

Values

| Value | Description | Remarks |
| --- | --- | --- |
| 0 | No Request | |
| 1 | Lock (all) | |
| 2 | Unlock (all) | |
| 3 | Reserved | |

Remarks

N/A

3.6.2.3. Device Authentication Signature the 1st word, Device Authentication Signature the 2nd word, Device Authentication Signature the 3rd word, Device Authentication Signature the 4th word, Device Authentication Seed the 1st word, Device Authentication Seed the 2nd word Device Authentication Signature the 1st word is presented in from 1st to 8th bytes of the signature.

Device Authentication Signature the 2nd word is presented in from 9th to 16th bytes of the signature.

Device Authentication Signature the 3rd word is presented in from 17th to 24th bytes of the signature.

Device Authentication Signature the 4th word is presented in from 25th to 32nd bytes of the signature.

Device Authentication Seed the 1st word is presented in from 1st to 8th bytes of the seed.

Device Authentication Seed the 2nd word is presented in from 9th to 16th bytes of the seed.

3.6.2.4. Door Lock (1st Left) Status

Values

| Value | Description | Remarks |
| --- | --- | --- |
| 0 | Reserved | |
| 1 | Locked | |
| 2 | Unlocked | |
| 3 | Invalid | |

Remarks
N/A

3.6.2.5. Door Lock (1st Right) Status

Values

| Value | Description | Remarks |
|---|---|---|
| 0 | Reserved | |
| 1 | Locked | |
| 2 | Unlocked | |
| 3 | Invalid | |

Remarks
N/A

3.6.2.6. Door Lock (2nd Left) Status

Values

| Value | Description | Remarks |
|---|---|---|
| 0 | Reserved | |
| 1 | Locked | |
| 2 | Unlocked | |
| 3 | Invalid | |

Remarks
N/A

3.6.2.7. Door Lock (2nd Right) Status

Values

| Value | Description | Remarks |
|---|---|---|
| 0 | Reserved | |
| 1 | Locked | |
| 2 | Unlocked | |
| 3 | Invalid | |

Remarks
N/A

3.6.2.8. Door Lock Status of all Doors

Values

| Value | Description | Remarks |
|---|---|---|
| 0 | Reserved | |
| 1 | All Locked | |
| 2 | Anything Unlocked | |
| 3 | Invalid | |

Remarks
In case any doors are unlocked, "Anything Unlocked."
In case all doors are locked, "All Locked."

3.6.2.9. Alarm System Status

Values

| Value | Description | Remarks |
|---|---|---|
| 0 | Disarmed | Alarm System is not activated. |
| 1 | Armed | Alarm System is activated without alarming. |
| 2 | Active | Alarm System is activated, and the alarm is beeping. |
| 3 | Invalid | |

Remarks
N/A

3.6.2.9.1. Trip Counter

This counter is incremented in a unit of trips by the Freshness Value management master ECU.

Values
0-FFFFh

Remarks
This value is used to create a Freshness value.
For details, please refer to the other material [the specification of Toyota's MAC module].

3.6.2.9.2. Reset Counter

This counter is incremented periodically by the Freshness Value management master ECU.

Values
0-FFFFFh

Remarks
This value is used to create a Freshness value.
For details, please refer to the other material [the specification of Toyota's MAC module].

3.6.2.10. 1st Left Door Open Status

Status of the current 1st-left door open/close of the vehicle platform

Values

| Value | Description | Remarks |
|---|---|---|
| 0 | Reserved | |
| 1 | Open | |
| 2 | Closes | |
| 3 | Invalid | |

Remarks
N/A

3.6.2.11. 1st Right Door Open Status

Status of the current 1st-right door open/close

Values

| Value | Description | Remarks |
|---|---|---|
| 0 | Reserved | |
| 1 | Open | |
| 2 | Close | |
| 3 | Invalid | |

Remarks
N/A

3.6.2.12. 2nd Left Door Open Status

Status of the current 2nd-left door open/close

Values

| Value | Description | Remarks |
|---|---|---|
| 0 | Reserved | |
| 1 | Open | |
| 2 | Close | |
| 3 | Invalid | |

Remarks
N/A

3.6.2.13. 2nd Right Door Open Status

Status of the current 2nd-right door open/close

Values

| Value | Description | Remarks |
|---|---|---|
| 0 | Reserved | |
| 1 | Open | |
| 2 | Close | |
| 3 | Invalid | |

Remarks
 N/A
3.6.2.14. Trunk Status
 Status of the current trunk door open/close
Values

| Value | Description | Remarks |
|---|---|---|
| 0 | Reserved | |
| 1 | Open | |
| 2 | Close | |
| 3 | Invalid | |

Remarks
 N/A
3.6.2.15. Hood Open Status
 Status of the current hood open/close
Values

| Value | Description | Remarks |
|---|---|---|
| 0 | Reserved | |
| 1 | Open | |
| 2 | Close | |
| 3 | Invalid | |

Remarks
 N/A
4. API Guides to Control Toyota Vehicles
 This section shows in detail the way of using APIs for Toyota vehicles.

4.1. APIs for Vehicle Motion Control
4.1.1. API List for Vehicle Motion Control
 Input and output APIs for vehicle motion control are shown in Table 14 and Table 15, respectively. Usage guides of some APIs are presented in the following sections as indicated in each table.
4.1.1.1. Inputs

TABLE 14

Input APIs for Vehicle Motion Control

| Signal Name | Description | Redundancy | Usage Guide |
|---|---|---|---|
| Propulsion Direction Command | Request for shift change from/to forward (D range) to/from back (R range) | N/A | 4.1.2.1 |
| Immobilization Command | Request for turning on/off WheelLock | Applied | 4.1.2.2 |
| Standstill Command | Request for keeping on/off stationary | Applied | 4.1.2.3 |
| Acceleration Command | Request for acceleration/deceleration | Applied | 4.1.2.1 4.1.2.2 4.1.2.3 4.1.2.4 |
| Front Wheel Steer Angle Command | Request for front wheel steer angle | Applied | 4.1.2.5 |
| Vehicle Mode Command | Request for changing from/to manual mode to/from Autonomous Mode | Applied | 4.1.2.6 |
| High Dynamics Command | Request for increasing braking response performance* | Applied | — |

*Reaction time in VP upon a request from ADK 4.1.1.2. Outputs

TABLE 15

Output APIs for Vehicle Motion Control

| Signal Name | Description | Redundancy | Usage Guide |
|---|---|---|---|
| Propulsion Direction Status | Current shift status | N/A | — |
| Immobilization Status | Status of immobilization (e.g. EPB and Shift P) | Applied | 4.1.2.2 4.1.2.3 |
| Standstill Status | Standstill status | N/A | 4.1.2.3 |
| Estimated Gliding Acceleration | Estimated vehicle acceleration/deceleration when throttle is fully closed | N/A | — |
| Estimated maximum acceleration | Estimated maximum acceleration | Applied | — |
| Estimated maximum deceleration | Estimated maximum deceleration | Applied | — |
| Front wheel steer angle | Front wheel steer angle | Applied | 4.1.2.5 |
| Front wheel steer angle rate | Front wheel steer angle rate | Applied | — |
| Front wheel steer angle rate limitation | Road wheel angle rate limit | Applied | — |
| Estimated maximum lateral acceleration | Estimated max lateral acceleration | Applied | — |
| Estimated maximum lateral acceleration rate | Estimated max lateral acceleration rate | Applied | — |
| intervention of accelerator pedal | This signal shows whether the accelerator pedal is depressed by a driver (intervention) | N/A | 4.1.2.4 |
| Intervention of brake pedal | This signal shows whether the brake pedal is depressed by a driver (intervention) | N/A | — |
| intervention of steering wheel | This signal shows whether the steering wheel is turned by a driver (intervention) | N/A | 4.1.2.5 |
| Intervention of shift lever | This signal shows whether the shift lever is controlled by a driver (intervention) | N/A | — |
| Wheel speed pulse (front left) | Pulse from wheel speed sensor (Front Left Wheel) | N/A | — |
| Wheel rotation direction (front left) | Rotation direction of wheel (Front Left) | N/A | — |
| Wheel speed pulse (front right) | Pulse from wheel speed sensor (Front Right Wheel) | N/A | — |
| Wheel rotation direction (front right) | Rotation direction of wheel (Front Right) | N/A | — |
| Wheel speed pulse (rear left) | Pulse from wheel speed sensor (Rear Left Wheel) | Applied | — |
| Wheel rotation direction (Rear left) | Rotation direction of wheel (Rear Left) | Applied | — |
| Wheel speed pulse (rear right) | Pulse from wheel speed sensor (Rear Right Wheel) | Applied | — |
| Wheel rotation direction (Rear right) | Rotation direction of wheel (Rear Right) | Applied | — |
| Traveling direction | Moving direction of vehicle | Applied | 4.1.2.1 4.1.2.3 |
| Vehicle velocity | Estimated longitudinal velocity of vehicle | Applied | 4.1.2.2 |

TABLE 15-continued

Output APIs for Vehicle Motion Control

| Signal Name | Description | Redundancy | Usage Guide |
|---|---|---|---|
| Longitudinal acceleration | Estimated longitudinal acceleration of vehicle | Applied | — |
| Lateral acceleration | Sensor value of lateral acceleration of vehicle | Applied | — |
| Yawrate | Sensor value of Yaw rate | Applied | — |
| Slipping Detection | Detection of tire glide/spin/skid | Applied | — |
| Vehicle mode state | State of whether Autonomous Mode, manual mode or others | Applied | 4.1.2.6 |
| Readiness for autonomization | Situation of whether the vehicle can transition to Autonomous Mode or not | Applied | 4.1.2.6 |
| Failure status of VP functions for Autonomous Mode | This signal is used to show whether VP functions have some failures mode when a vehicle works as Autonomous Mode. | Applied | — |
| PCS Alert Status | Status of PCS (Alert) | N/A | — |
| PCS Preparation Status | Status of PCS (Prefiil) | N/A | — |
| PCS Brake/PCS Brake Hold Status | Status of PCS (PB/PBH) | N/A | — |
| ADS/PCS arbitration status | ADS/PCS arbitration status | N/A | — |

4.1.2. API Guides in Details for Vehicle Motion Control 4.1.2.1. Propulsion Direction Command Please refer to 3.2.2.1 for value and remarks in detail.

Figure 20:
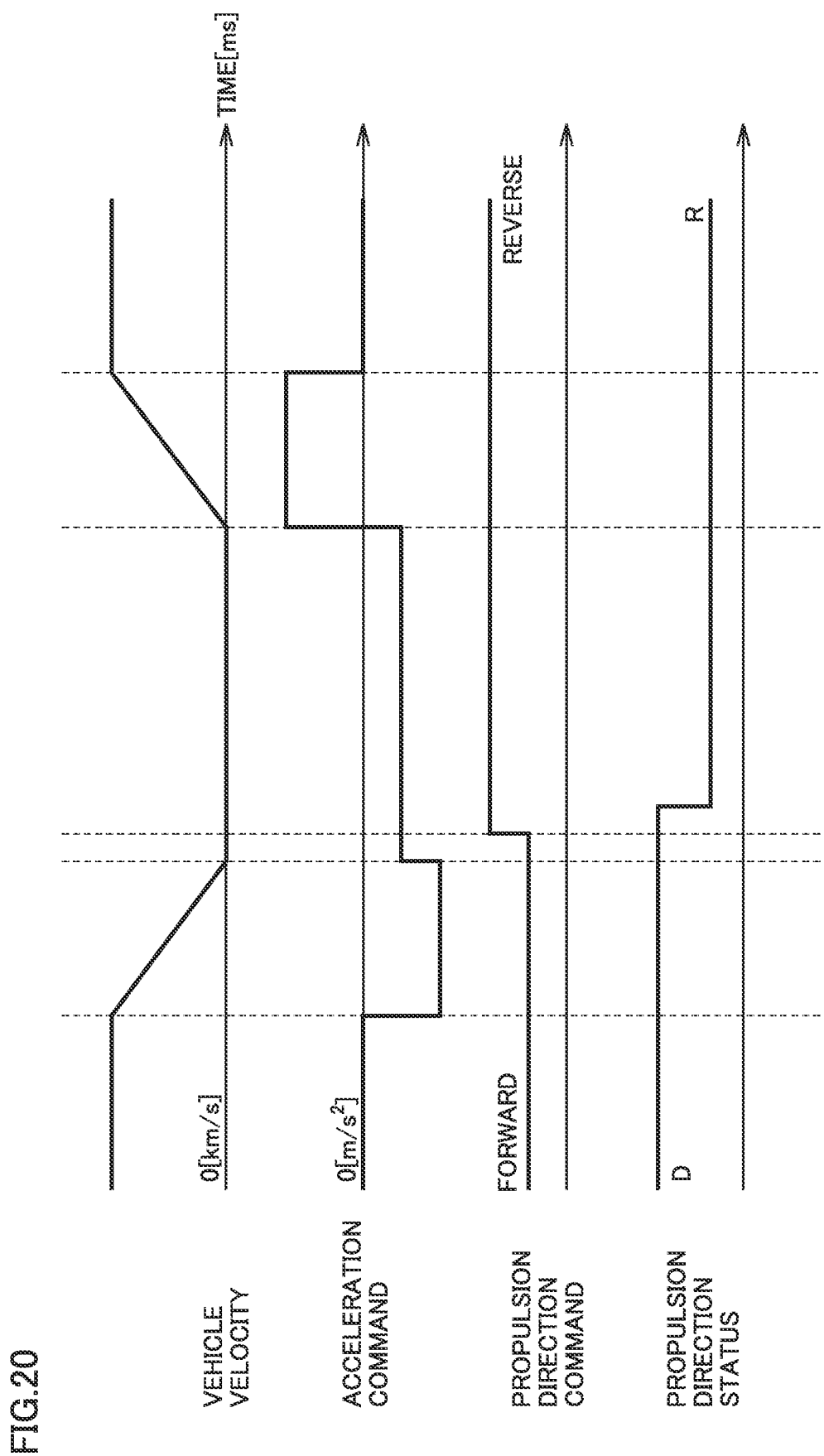
FIG. 20 is a diagram showing details of shift change sequences.

FIG. 20 shows shift change sequences in detail.

First deceleration is requested by Acceleration Command and the vehicle is stopped. When Traveling direction is set to "standstill", any shift position can be requested by Propulsion Direction Command. (In FIG. 20, "D"→"R").

Deceleration has to be requested by Acceleration Command until completing shift change.

After shift position is changed, acceleration/deceleration can be chosen based on Acceleration Command.

While Vehicle mode state=Autonomous Mode, driver's shift lever operation is not accepted.

4.1.2.2. Immobilization Command

Please refer to 3.2.2.2 for value and remarks in detail.

Figure 21:
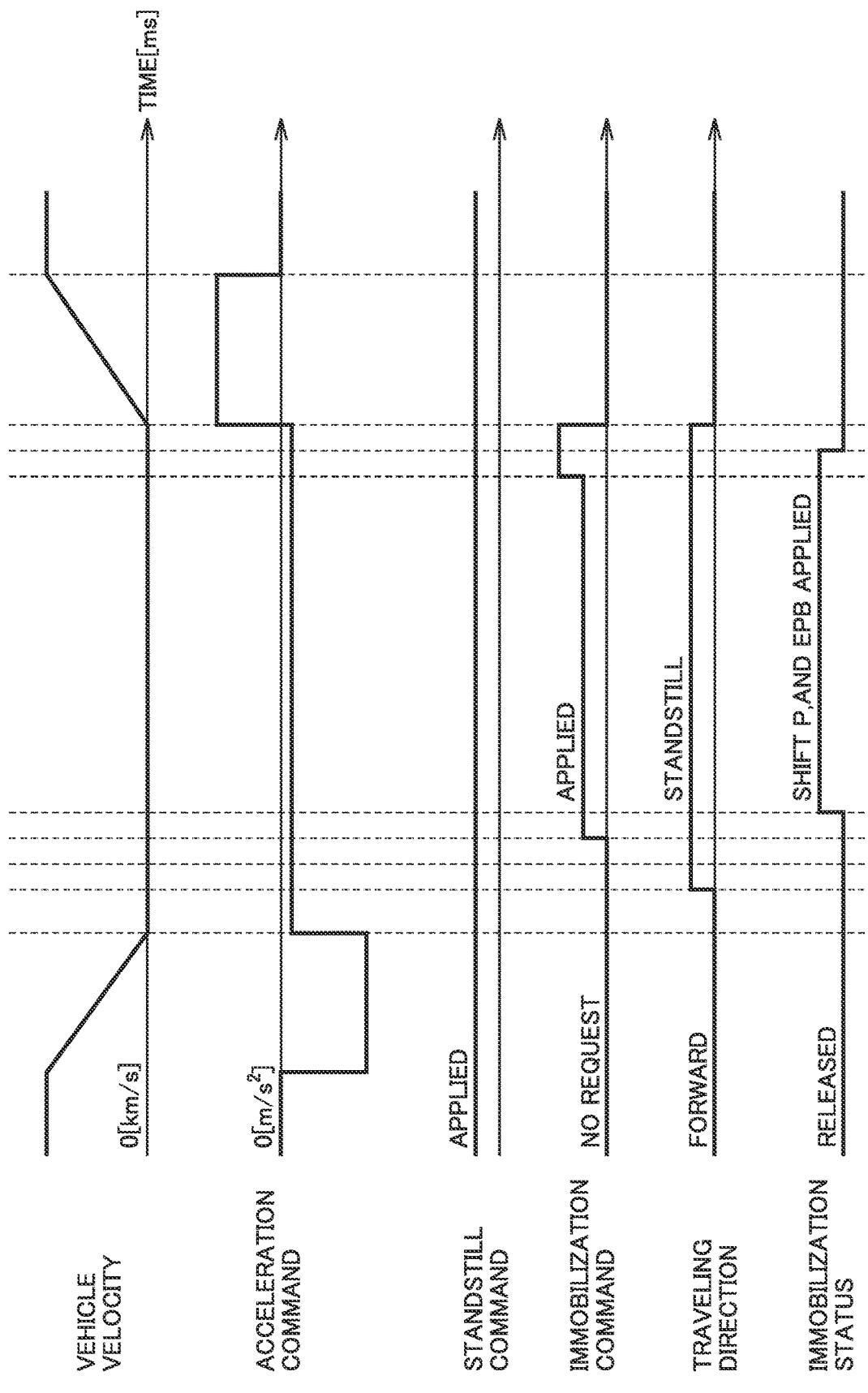
FIG. 21 is a diagram showing immobilization sequences.

FIG. 21 shows how to activate/deactivate immobilization function.

Deceleration is requested with Acceleration Command to make a vehicle stop. When Vehicle velocity goes to zero, Immobilization function is activated by Immobilization Command="Applied". Acceleration Command is set to Deceleration until Immobilization Status is set to "Applied".

When deactivating Immobilization function, Immobilization Command="Released" has to be requested and simultaneously Acceleration Command has to be set as deceleration until confirming Immobilization Status="Released".

After Immobilization function is deactivated, the vehicle can be accelerated/decelerated based on Acceleration Command.

4.1.2.3. Standstill Command

Please refer to 3.2.2.3 for value and remarks in detail.

In case where Standstill Command is set as "Applied", brakehold function can be ready to be used and brakehold function is activated in a condition where a vehicle stops and Acceleration Command is set as Deceleration (<0). And then Standstill Status is changed to "Applied". On the other hand, in case where Standstill Command is set as "Released", brakehold function is deactivated.

Figure 22:
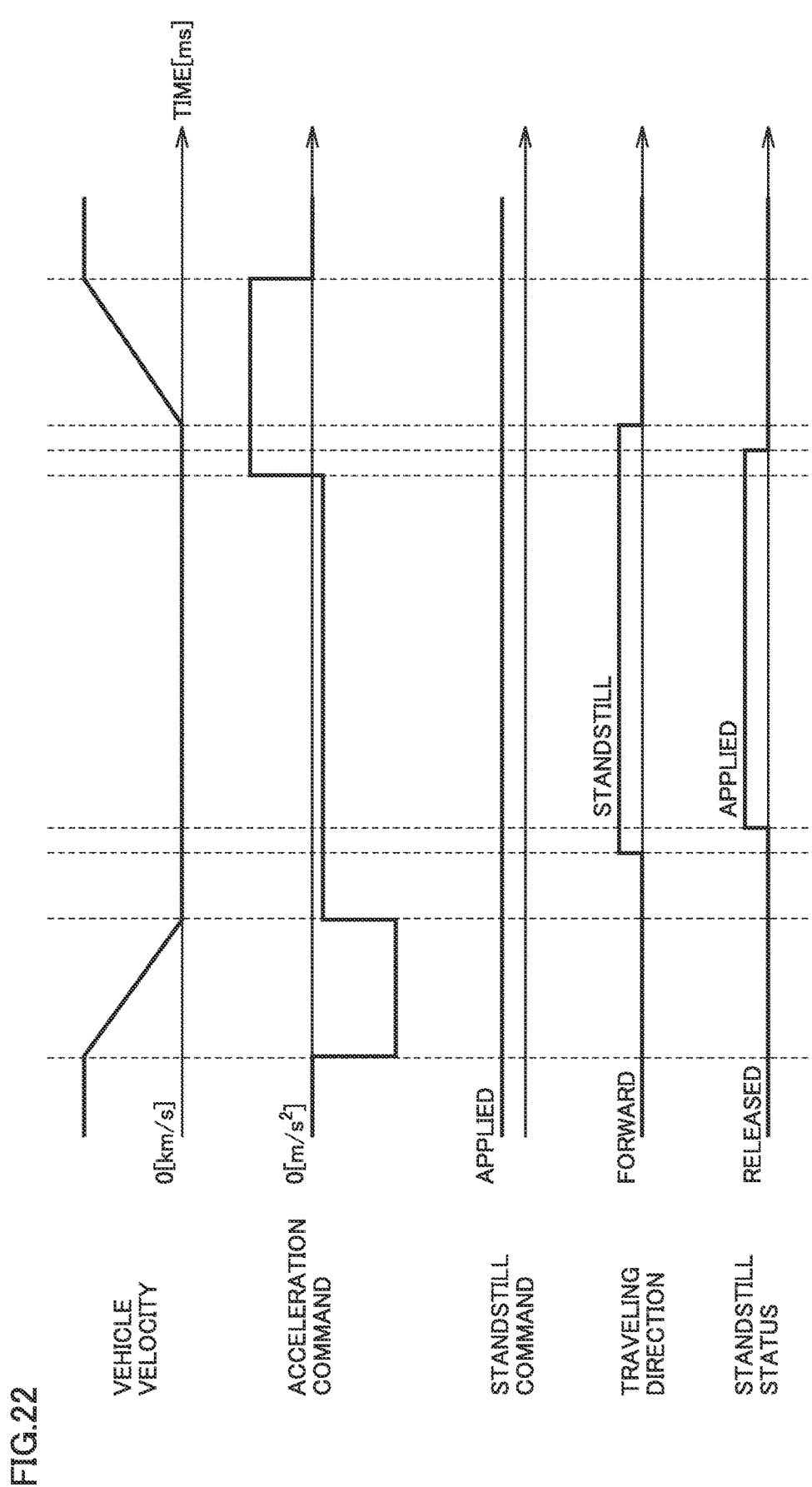
FIG. 22 is a diagram showing standstill sequences.

FIG. 22 shows standstill sequences.

To make a vehicle stop, deceleration is requested with Acceleration Command.

When the vehicle stops for a while, Traveling direction is changed to "standstill". Even during Standstill status="Applied", deceleration shall be requested with Acceleration Command.

If you want the vehicle to move forward, Acceleration Command is set as Acceleration (>0). Then brake hold function is released and the vehicle is accelerated.

4.1.2.4. Acceleration Command

Please refer to 3.2.2.4 for value and remarks in detail.

The below shows how a vehicle behaves when an acceleration pedal is operated.

In case where the accelerator pedal is operated, a maximum acceleration value of either 1) one calculated from accelerator pedal stroke or 2) Acceleration Command input from ADK is chosen. ADK can see which value is selected by checking Intervention of accelerator pedal.

The below shows how a vehicle behaves when a brake pedal is operated.

Deceleration value in the vehicle is the sum of 1) one calculated from the brake pedal stroke and 2) one requested from ADK.

4.1.2.5. Front Wheel Steer Angle Command

Please refer to 3.2.2.5 for value and remarks in detail.

The below shows the way of using Front Wheel Steer Angle Command.

Front Wheel Steer Angle Command is set as a relative value from Front wheel steer angle.

For example, in case where Front wheel steer angle=0.1 [rad] and a vehicle goes straight;

If ADK would like to go straight, Front Wheel Steer Angle Command should be set to 0+0.1=0.1[rad].

If ADK requests to steer by −0.3 [rad], Front Wheel Steer Angle Command should be set to −0.3+0.1=−0.2 [rad].

The below shows how a vehicle behaves when a driver operates the steering.

A maximum value is selected either from 1) one calculated from steering wheel operation by the driver or 2) one requested by ADK.

Note that Front Wheel Steer Angle Command is not accepted if the driver strongly operates the steering wheel. This situation can be found by Intervention of steering wheel flag.

4.1.2.6. Vehicle Mode Command

Figure 23:
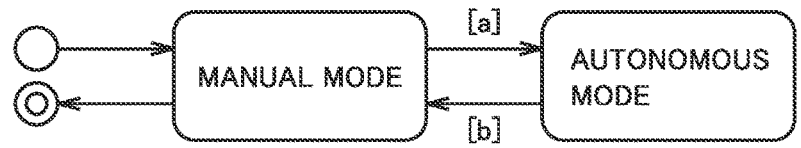
FIG. 23 is a state machine diagram of an autonomy state.

The state machine of mode transition for Autono-MaaS vehicle is shown in FIG. 23.

The explanation of each state is shown as follows.

| State | Description |
|---|---|
| Manual | A vehicle begins with this state and is under a control of a human driver. ADK cannot give any controls (except some commands) to VP. Power mode status and Vehicle mode state are in the followings: Power mode status = Wake or Drive Vehicle mode state = Manual Mode |
| Autonomy | ADK can communicate to VP after authentication is successful. VP is under the control of the ADK as a result of being issued "Request for Autonomy." Power mode status and Vehicle mode state are in the followings: Power mode status = Drive Vehicle mode state = Autonomous Mode |

The explanation of each transition is shown as follows.

| Transition | Conditions |
|---|---|
| a | When the following conditions are established, the mode will be transitioned from Manual to Autonomy: The ADK is authenticated, Power mode status = Drive, Readiness for autonomization = Ready For Autonomy Vehicle Mode Command = Request For Autonomy. |
| b | When the following conditions are established, the mode will be transitioned from Autonomy to Manual: Vehicle Mode Command = Deactivation Request. |

4.2. APIs for BODY Control
4.2.1. API List for BODY Control
4.2.1.1. Inputs

TABLE 16

Input APIs for BODY Control

| Signal Name | Description | Redundancy | Usage Guide |
|---|---|---|---|
| Turnsignal command | Command to control the turnsignallight mode of the vehicle platform | N/A | — |
| Headlight command | Command to control the headlight mode of the vehicle platform | N/A | — |
| Hazardlight command | Command to control the hazardlight mode of the vehicle platform | N/A | — |
| Horn pattern command | Command to control the pattern of horn ON-time and OFF-time per cycle of the vehicle platform | N/A | — |
| Horn cycle command | Command to control the number of horn ON/OFF cycles of the vehicle platform | N/A | — |
| Continuous horn command | Command to control of horn ON of the vehicle platform | N/A | — |
| Front windshield wiper command | Command to control the front windshield wiper of the vehicle platform | N/A | — |
| Rear windshield wiper command | Command to control the rear windshield wiper mode of the vehicle platform | N/A | — |
| HVAC (1st row) operation command | Command to start/stop 1st row air conditioning control | N/A | — |
| HVAC (2nd row) operation command | Command to start/stop 2nd row air conditioning control | N/A | — |
| Target temperature (1st left) command | Command to set the target temperature around front left area | N/A | — |
| Target temperature (1st right) command | Command to set the target temperature around front right area | N/A | — |
| Target temperature (2nd left) command | Command to set the target temperature around rear left area | N/A | — |
| Target temperature (2nd right) command | Command to set the target temperature around rear right area | N/A | — |
| HVAC fan (1st row) command | Command to set the fan level on the front AC | N/A | — |
| HVAC fan (2nd row) command | Command to set the fan level on the rear AC | N/A | — |

TABLE 16-continued

Input APIs for BODY Control

| Signal Name | Description | Redundancy | Usage Guide |
|---|---|---|---|
| Air outlet (1st row) command | Command to set the mode of 1st row air outlet | N/A | — |
| Air outlet (2nd row) command | Command to set the mode of 2nd row air outlet | N/A | — |
| Air recirculation command | Command to set the air recirculation mode | N/A | — |
| AC mode command | Command to set the AC mode | N/A | — |

4.2.1.2. Outputs

TABLE 17

Output APIs for BODY Control

| Signal Name | Description | Redundancy | Usage Guide |
|---|---|---|---|
| Turnsignal status | Status of the current turnsignallight mode of the vehicle platform | N/A | — |
| Headlight status | Status of the current headlight mode of the vehicle platform | N/A | — |
| Hazardlight status | Status of the current hazardlight mode of the vehicle platform | N/A | — |
| Horn status | Status of the current horn of the vehicle platform | N/A | — |
| Front windshield wiper status | Status of the current front windshield wiper mode of the vehicle platform | N/A | — |
| Rear windshield wiper status | Status of the current rear windshield wiper mode of the vehicle platform | N/A | — |
| HVAC (1st row) status | Status of activation of the $1^{st}$ row HVAC | N/A | — |
| HVAC (2nd row) status | Status of activation of the $2^{nd}$ row HVAC | N/A | — |
| Target temperature (1st left) status | Status of set temperature of $1^{st}$ row left | N/A | — |
| Target temperature (1st right) status | Status of set temperature of $1^{st}$ row right | N/A | — |
| Target temperature (2nd left) status | Status of set temperature of $2^{nd}$ row left | N/A | — |
| Target temperature (2nd right) status | Status of set temperature of $2^{nd}$ row right | N/A | — |
| HVAC fan (1st row) status | Status of set fan level of $1^{st}$ row | N/A | — |
| HVAC fan (2nd row) status | Status of set fan level of $2^{nd}$ row | N/A | — |
| Air outlet (1st row) status | Status of mode of 1st row air outlet | N/A | — |
| Air outlet (2nd row) status | Status of mode of 2nd row air outlet | N/A | — |
| Air recirculation status | Status of set air recirculation mode | N/A | — |
| AC mode status | Status of set AC mode | N/A | — |
| Seat occupancy (1st right) status | Seat occupancy status in 1st left seat | N/A | — |
| Seat belt (1st left) status | Status of driver's seat belt buckle switch | N/A | — |
| Seat belt (1st right) status | Status of passenger's seat belt buckle switch | N/A | — |
| Seat belt (2nd left) status | Seat belt buckle switch status in 2nd left seat | N/A | — |
| Seat belt (2nd right) status | Seat belt buckle switch status in 2nd right seat | N/A | — |

4.3. APIs for Power Control
4.3.1. API List for Power Control
4.3.1.1. Inputs

TABLE 18

Input APIs for Power Control

| Signal Name | Description | Redundancy | Usage Guide |
|---|---|---|---|
| Power mode command | Command to control the power mode of VP | N/A | — |

4.3.1.2. Outputs

TABLE 19

Output APIs for Power Control

| Signal Name | Description | Redundancy | Usage Guide |
|---|---|---|---|
| Power mode status | Status of the current power mode of VP | N/A | — |

4.4. APIs for Failure Notification
4.4.1. API List for Failure Notification
4.4.1.1. Inputs

TABLE 20

Input APIs for Failure Notification

| Signal Name | Description | Redundancy | Usage guide |
|---|---|---|---|
| N/A | — | — | — |

4.4.1.2. Outputs

TABLE 21

Output APIs for Failure Notification

| Signal Name | Description | Redundancy | Usage guide |
|---|---|---|---|
| Request for ADS Operation | — | Applied | — |
| Impact detection signal | — | N/A | — |
| Performance deterioration of Brake system | — | Applied | — |
| Performance deterioration of Propulsion system | — | N/A | — |
| Performance deterioration of Shift control system | — | N/A | — |
| Performance deterioration of Immobilization system | — | Applied | — |
| Performance deterioration of Steering system | — | Applied | — |
| Performance deterioration of Power supply system | — | Applied | — |
| Performance deterioration of Communication system | — | Applied | — |

4.5. APIs for Security
4.5.1. API List for Security

Input and output APIs for Security are shown in Table 22 and Table 23, respectively. Usage guides of some APIs are presented in the following sections as indicated in each table.

4.5.1.1. Inputs

TABLE 22

Input APIs for Security

| Signal Name | Description | Redundancy | Usage Guide |
|---|---|---|---|
| Door Lock (front) command | Command to control 1st both doors lock | N/A | — |
| Door Lock (rear) command | Command to control 2nd both doors and trunk lock | N/A | — |
| Central door lock command | Command to control the all door lock | N/A | — |
| Device Authentication Signature the 1st word | This is the 8th byte from the 1st byte of the Signature value. | N/A | 4.5.2.1 |
| Device Authentication Signature the 2nd word | This is the 16th byte from the 9th byte of the Signature value. | N/A | 4.5.2.1 |
| Device Authentication Signature the 3rd word | This is the 24th byte from the 17th byte of the Signature value. | N/A | 4.5.2.1 |
| Device Authentication Signature the 4th word | This is the 32th byte from the 25th byte of the Signature value. | N/A | 4.5.2.1 |

4.5.1.2. Outputs

TABLE 23

Output APIs for Security

| Signal Name | Description | Redundancy | Usage Guide |
|---|---|---|---|
| Door lock. (1st left) status | Status of the current 1st-left door lock | N/A | — |
| Door lock (1st right) status | Status of the current 1st-right door lock | N/A | — |
| Door lock (2nd left) status | Status of the current 2nd-left door lock | N/A | — |
| Door lock (2nd right) status | Status of the current 2nd-right door lock | N/A | — |
| Central door lock status | Status of the current all door lock | N/A | — |
| Alarm system status | Status of the current vehicle alarm | N/A | — |
| Device Authentication Seed the 1st word | This is the 8th byte from the 1st byte of the Seed value. | N/A | — |
| Device Authentication Seed the 2nd word | This is the 16th byte from the 9th byte of the Seed value. | N/A | — |
| Trip Counter | This counter is incremented in units of trips by the Freshness Value management master ECU. | N/A | — |
| Reset Counter | This counter is incremented periodically by the Freshness Value management master ECU. | N/A | — |
| 1st Left Door Open Status | Status of the current 1st-left door open/close of the vehicle platform | N/A | — |
| 1st Right Door Open Status | Status of the current 1st-right door open/close of the vehicle platform | N/A | — |
| 2nd Left Door Open Status | Status of the current 2nd-left door open/close of the vehicle platform | N/A | — |
| 2nd Right Door Open Status | Status of the current 2nd-right door open/close of the vehicle platform | N/A | — |
| Trunk Status | Status of the current trunk door open of the vehicle platform | N/A | — |
| Hood Open Status | Status of the current hood open/close of the vehicle platform | N/A | — |

4.5.2. API guides in Details for Security
4.5.2.1. Device Authentication Protocol Device authentication is applied when the VCIB is activated from "Sleep" mode.

After the authentication succeeds, the VCIB can start to communicate with ADK.

Figure 24:
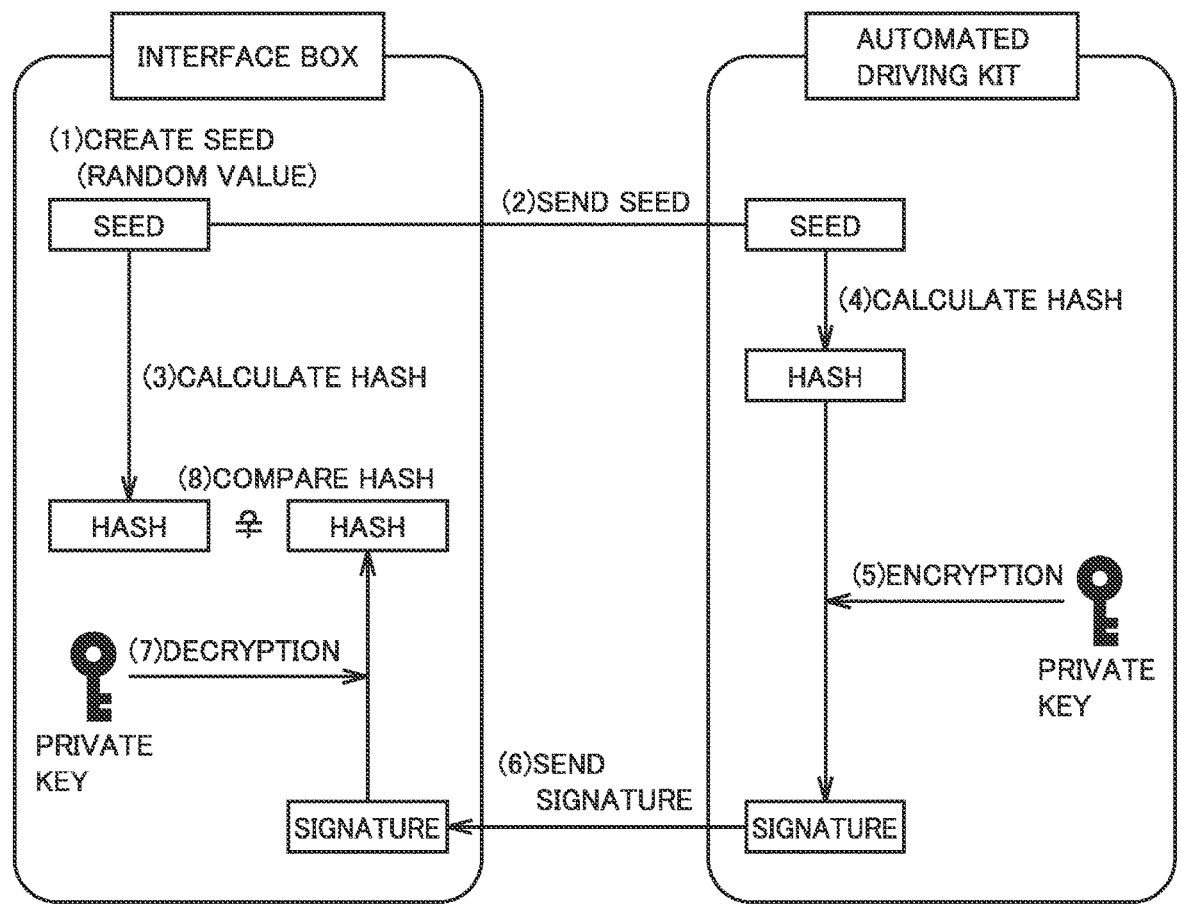
FIG. 24 is a diagram showing an authentication process.

Authentication process is as shown in FIG. 24 Authentication Process.

Authentication Specification

| Item | Specification | Note |
|---|---|---|
| Encryption algorithms | AES | FIPS 197 |
| Key length | 128 bit | — |
| Block cipher modes of operation | CBC | SP 800-38A |
| Hash algorithms | SHA-256 | FIPS 180-4 |
| Seed length | 128 bit | — |
| Signature length | 256 bit | — |

Though an embodiment of the present disclosure has been described, it should be understood that the embodiment disclosed herein is illustrative and non-restrictive in every respect. The scope of the present disclosure is defined by the terms of the claims and is intended to include any modifications within the scope and meaning equivalent to the terms of the claims.

What is claimed is:

1. A vehicle control interface that interfaces between an autonomous driving system (ADS) and a vehicle platform (VP) that controls a vehicle in accordance with a control request from the ADS, the vehicle including a first manual mode that is set when the VP is turned on and that does not require that an operator is present in the VP, a second manual mode in which the operator is required to be present in the VP and the VP is under control by the operator, and an autonomy mode in which the VP is under control by the ADS, the vehicle control interface comprising:
   a processor; and
   a memory in which a program executable by the processor is stored, wherein
   the processor is configured to
      inform the ADS whether the operator is present in the VP,
      receive, from the ADS, an operator command for transition of the vehicle from the first manual mode to the second manual mode when it has been determined that the operator is present in the VP, and not transitioning the vehicle from the first manual mode to the autonomy mode when it has not been determined that the operator is present in the VP, and
      after the vehicle has transitioned to the second manual mode in which the operator is present in the VP, provide the ADS with an autonomy ready signal indicating readiness for autonomous driving of the VP and receive, from the ADS, an autonomy request for transition of the vehicle from the second manual mode to the autonomy mode.

2. The vehicle control interface according to claim 1, wherein
   the processor is configured to receive, from the ADS, an autonomy deactivation request that requests cancellation of the autonomy mode, while the vehicle is in the autonomy mode.

3. The vehicle control interface according to claim 1, wherein
   the vehicle further includes a sleep mode in which the vehicle control interface is shut down, and
   the processor is configured to receive, from the ADS, a power mode request for transition of the vehicle from the second manual mode to the sleep mode, while the vehicle is in the second manual mode.

4. The vehicle control interface according to claim 1, wherein
   the vehicle further includes a maintenance mode for maintenance of the vehicle, and
   the processor is configured to, while transitioning from the first manual mode to the maintenance mode:
      provide the ADS with a power mode status signal indicating that ignition of the VP is on,
      provide the ADS with a propulsion direction status signal indicating that a shift range is set to a Park (P) range,
      provide the ADS with an actual moving direction signal indicating that the VP is at a standstill, and
      receive, from the ADS, a maintenance request to perform maintenance of the vehicle.

5. The vehicle control interface according to claim 4, wherein
   the processor is configured to, while transitioning from the maintenance mode to the first manual mode:
      provide the ADS with the power mode status signal indicating that ignition of the VP is on,
      provide the ADS with the propulsion direction status signal indicating that the shift range is set to the P range,
      provide the ADS with the actual moving direction signal indicating that the VP is at the standstill, and
      receive, from the ADS, no request for maintenance of the vehicle.

6. A vehicle comprising the VP including the vehicle control interface according to claim 1.

7. An autonomous driving system (ADS) mountable on a vehicle, the vehicle including a vehicle platform (VP) that controls the vehicle in accordance with a control request from the ADS, the VP including a vehicle control interface that interfaces between the ADS and the VP, the vehicle including a first manual mode that is set when the VP is turned on and that does not require that an operator is present in the VP, a second manual mode in which the operator is required to be present in the VP and the VP is under control by the operator, and an autonomy mode in which the VP is under control by the ADS, the ADS comprising:
   a compute assembly; and
   a communication module configured to communicate with the vehicle control interface, wherein
   the compute assembly is configured to
      receive from the vehicle control interface an indication as to whether the operator is present in the VP,
      (i) when it has been determined that the operator is present in the VP, provide the vehicle control interface with an operator command for transition of the vehicle from the first manual mode to the second manual mode, and (ii) when it has not been determined that the operator is present in the VP, not provide the vehicle control interface with the operator command for transition of the vehicle from the first manual mode to the autonomy mode, and
      receive, from the vehicle control interface, an autonomy ready signal indicating readiness for autonomous driving of the VP after the vehicle has transitioned to the second manual mode in which the operator is present in the VP, and provide the vehicle control interface with an autonomy request for transition of the vehicle from the second manual mode to the autonomy mode.

8. The ADS according to claim 7, wherein
the compute assembly is configured to provide the vehicle control interface with an autonomy deactivation request that requests cancellation of the autonomy mode, while the vehicle is in the autonomy mode.

9. The ADS according to claim 7, wherein
the vehicle further includes a sleep mode in which the vehicle control interface is shut down, and
the compute assembly is configured to provide the vehicle control interface with a power mode request for transition of the vehicle from the second manual mode to the sleep mode, while the vehicle is in the second manual mode.

10. The ADS according to claim 7, wherein
the vehicle further includes a maintenance mode for maintenance of the vehicle, and
the compute assembly is configured to, while transitioning the VP from the first manual mode to the maintenance mode:
   receive, from the vehicle control interface, a power mode status signal indicating that ignition of the VP is on, receive, from the vehicle control interface, a propulsion direction status signal indicating that a shift range is set to a Park (P) range, receive, from the vehicle control interface, an actual moving direction signal indicating that the VP is at a standstill, and provide the vehicle control interface with a maintenance request to perform maintenance of the vehicle.

11. The ADS according to claim 10, wherein the compute assembly is configured to, while transitioning the VP from the maintenance mode to the first manual mode:

receive, from the vehicle control interface, the power mode status signal indicating that ignition of the VP is on, receive, from the vehicle control interface, the propulsion direction status signal indicating that the shift range is set to the P range, receive, from the vehicle control interface, the actual moving direction signal indicating that the VP is at the standstill, and provide the vehicle control interface with no request for maintenance of the vehicle.

12. A vehicle comprising:
the ADS according to claim 7; and
the VP.

13. A method of controlling a vehicle, the vehicle including a vehicle platform (VP) that controls the vehicle in accordance with a control request from an autonomous driving system (ADS), the VP including a vehicle control interface that interfaces between the ADS and the VP, the method comprising:

setting the vehicle to a first manual mode when the VP is turned on, the first manual mode does not require that an operator is present in the VP; and making transition, by the vehicle, from the first manual mode via a second manual mode to an autonomy mode, wherein the second manual mode is a mode in which the operator is required to be present in the VP and the VP is under control by the operator, the autonomy mode is a mode in which the VP is under control by the ADS, the vehicle cannot transition directly from the first manual mode to the autonomy mode, the vehicle transitions from the first manual mode to the second manual mode when it has been determined that the operator is present in the VP, and the vehicle does not transition from the first manual mode to the autonomy mode when it has not been determined that the operator is present in the VP.

14. The method according to claim 13, further comprising making transition, by the vehicle, from the autonomy mode to the second manual mode when an autonomy deactivation request that requests cancellation of the autonomy mode is provided from the ADS to the vehicle control interface.

15. The method according to claim 13, wherein
the vehicle further includes a sleep mode in which the vehicle control interface is shut down, and
the method further comprises making transition from the second manual mode to the sleep mode when a power mode request for transition of the vehicle from the second manual mode to the sleep mode is provided from the ADS to the vehicle control interface.

16. The method according to claim 13, wherein
the vehicle further includes a maintenance mode for maintenance of the vehicle, and
the method further comprises making transition, by the vehicle, from the first manual mode to the maintenance mode when first, second, third, and fourth conditions are satisfied,
the first condition is a condition that a power mode status signal indicating that ignition of the VP is on is provided from the vehicle control interface to the ADS,
the second condition is a condition that a propulsion direction status signal indicating that a shift range is set to a Park (P) range is provided from the vehicle control interface to the ADS,
the third condition is a condition that an actual moving direction signal indicating that the VP is at a standstill is provided from the vehicle control interface to the ADS, and
the fourth condition is a condition that a maintenance request to perform maintenance of the vehicle is provided from the ADS to the vehicle control interface.

17. The method according to claim 16, further comprising making transition, by the vehicle, from the maintenance mode to the first manual mode when fifth, sixth, seventh, and eighth conditions are satisfied, wherein
the fifth condition is a condition that the power mode status signal indicating that ignition of the VP is on is provided from the vehicle control interface to the ADS,
the sixth condition is a condition that the propulsion direction status signal indicating that the shift range is set to the P range is provided from the vehicle control interface to the ADS,
the seventh condition is a condition that the actual moving direction signal indicating that the VP is at the standstill is provided from the vehicle control interface to the ADS, and
the eighth condition is a condition that no request for maintenance of the vehicle is provided from the ADS to the vehicle control interface.

* * * * *